(12) United States Patent
Bundo et al.

(10) Patent No.: US 6,713,144 B2
(45) Date of Patent: Mar. 30, 2004

(54) MULTILAYER MATERIAL

(75) Inventors: Masaaki Bundo, Kawanishi (JP); Koji Takabatake, Mino (JP); Toshio Awaji, Kawanishi (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/168,972

(22) PCT Filed: Dec. 28, 2000

(86) PCT No.: PCT/JP00/09396

§ 371 (c)(1),
(2), (4) Date: Sep. 6, 2002

(87) PCT Pub. No.: WO01/47707

PCT Pub. Date: Jul. 5, 2001

(65) Prior Publication Data

US 2003/0099828 A1 May 29, 2003

(30) Foreign Application Priority Data

Dec. 28, 1999 (JP) ............................................ 11-374890

(51) Int. Cl.⁷ ................................................. B32B 7/10
(52) U.S. Cl. ..................... 428/40.1; 428/41.3; 428/41.5; 428/41.7; 428/42.1; 428/42.2; 428/200; 428/354; 428/913
(58) Field of Search ............................... 428/40.1, 42.1, 428/354, 913, 41.3, 41.5, 41.7, 200, 42.2

(56) References Cited

U.S. PATENT DOCUMENTS

| | | | |
|---|---|---|---|
| 4,369,223 A | 1/1983 | Phillips | |
| 4,425,287 A | 1/1984 | Hesse et al. | |
| 5,166,007 A | 11/1992 | Smith et al. | |
| 6,316,089 B1 | 11/2001 | Ohtani et al. | |

FOREIGN PATENT DOCUMENTS

| | | |
|---|---|---|
| DE | 2831679 A1 | 5/1979 |
| DE | 3826304 A1 | 8/1988 |
| EP | 0023634 A1 | 7/1980 |
| JP | 56045925 | 4/1981 |
| JP | 56-156846 | 11/1981 |
| JP | 57-99375 | 6/1982 |
| JP | 57-99375 A | 6/1982 |
| JP | 58-164734 | 11/1983 |
| JP | 59001250 | 1/1984 |
| JP | 63-186744 A | 8/1988 |
| JP | 63-186744 | 8/1988 |
| JP | 11-263857 | 9/1999 |

OTHER PUBLICATIONS

Microfilm of the specification and drawings annexed to the request of Japanese Utility Model Application No. 54324/1980 (laid–open No. 156846/1981) (The Yokohama Rubber Co., LTd.), Nov. 24, 1981, Claims of Utility Model; p. 3, lines 1 to 4; p. 4, lines 18 to 20; drawings.

(List continued on next page.)

*Primary Examiner*—Nasser Ahmad
(74) *Attorney, Agent, or Firm*—Sughrue Mion, PLLC

(57) ABSTRACT

The present invention provides a multilayer material which is excellent in applicability, is satisfactorily prevented from causing poor adhesion to various substrates, gives cured products having sufficient fundamental performance characteristics with improved adhesion strength, durability etc. and, accordingly, can be applied in various fields of use.

The present invention is a multilayer material comprising
a light-shielding layer (a), a curable molding material layer (b), a tacky layer (c) and a releasing layer (d),
with one side of the curable molding material layer (b) having the light-shielding layer (a) and the other side having the tacky layer (c) and releasing layer (d) in that order from the inside.

10 Claims, 5 Drawing Sheets

(1)

OTHER PUBLICATIONS

Microfilm of the specification and drawings annexed to the request of Japanese Utility Model Application No. 62005/1982 (Laid–open No. 164734/1983) (The Yokohama Rubber Co., Ltd.), Nov. 2, 1983, Claims of Utility Model; p. 6, lines 5 to 6; drawings.

32nd Annual Technical Conference 1977, Reinforced Plastic/Composites Institute, The Society of the Plastics Industry, Inc., "The Curing Of Unsaturated Polyester Resins With Visible Light" by B. Dixon, D. Longenecker and G. Greth, Section 5–D, 1977, pp. 1–6.

39th Annual Conference, Reinforced Plastic/Composites Institute, The Society of the Plastics Industry, Inc., Jan. 16–19, 1984 "Photocuring "Prepregs": New Opportunities For Efficient RP–Processing", by D. Scholz and W. Koser, 1984, Session 9–D, pp. 1–5.

(1)

(2)

(1)

(2)

MULTILAYER MATERIAL

TECHNICAL FIELD

This is a National stage entry under 35 U.S.C. § 371 of PCT Application No. JP00/09396 filed Dec. 28, 2000.

BACKGROUND ART

Multilayer materials comprising a curable molding material layer have flexibility before curing and, therefore, can be worked according to an arbitrary shape and size and, after working, applied to substrates with ease. Further, after curing, they show good mechanical, chemical, electrical and other fundamental performance characteristics comparable to those of fiber-reinforced plastics.

If multilayer materials comprising such a curable molding material layer become available which are capable of being easily worked and applied, making it possible to secure an ample operating time, showing sufficient adhesiveness to adapt to various surface conditions and complicated shapes and forms of various substrates, such as metals, plastics, rubbers, glass, ceramic ware, stone and wood, and satisfactorily suppressing the incidence of troubles due to poor adhesion to substrates, they will be useful, in various fields of application, as structural members, pipes, linings and so forth in various buildings, machines, automobiles, ships, household utensils and the like, and as reinforcing materials for reinforcing or repairing them.

In Japanese Kokai Publication Sho-59-1250, there is disclosed a method of applying a prepreg to steel sheet which comprises coating a curable prepreg with a curable and lipophilic primer, then causing the coated surface to bond closely to a steel sheet and, thereafter, curing the prepreg and primer. This application method can suppress the occurrence of poor prepreg-steel sheet adhesion to a certain extent by causing the prepreg to swell a little by means of the primer.

However, there is the possibility of failure to secure sufficient adhesion to certain substrates. Further, since the prepreg and/or primer may cure during application, the application time is limited and/or the prepreg may fail to stick to substrates sufficiently, hence the occurrence of poor adhesion may not be suppressed to a satisfactory extent. Furthermore, the necessity of using a primer in the step of application makes the relevant application work complicated.

In Japanese Kokai Publication Sho-63-186744, there is disclosed a photocurable prepreg having a transparent sheet bonded to one side thereof. A feature of this photocurable prepreg is that the surface of the cured product becomes smooth and good-looking owing to the transparent sheet. However, primer application is necessary for adhering to a substrate and, even by primer application, there is still the possibility of failure to secure sufficient adhesion to certain substrates. Further, the application work is complicated.

In Japanese Kokai Publication Sho-57-99375, there is disclosed a method of reinforcing thin steel sheet which comprises adhering a curable molding material layer to a thin steel sheet using a photocurable epoxy vinyl ester resin containing a specific dibasic acid and/or oligoester in the resin skeleton, followed by curing by exposure to light. This reinforcing method can indeed improve the adhesion strength of the curable molding material layer to the thin steel sheet to a certain extent but sufficient adhesion may not be secured for certain substrates. Further, the method may fail to prevent poor adhesion sufficiently and the application work is complicated.

SUMMARY OF THE INVENTION

It is an object of the present invention, which has been made in view of the above-described state of the art, to provide a multilayer material which is excellent in applicability, can fully prevent the occurrence of poor adhesion to various substrates, can give cured products having sufficient fundamental performance characteristics and, further, can bring about improvements in adhesion strength and durability, among others, hence can be applied in various fields of purpose.

The present invention provides a multilayer material comprising a light-shielding layer (a), a curable molding material layer (b), a tacky layer (c) and a releasing layer (d), with one side of the curable molding material layer (b) having the light-shielding layer (a) and the other side having the tacky layer (c) and releasing layer (d) in that order from the inside.

The present invention also provides a reinforcing material comprising the multilayer material.

BRIEF DESCRIPTION OF THE DRAWINGS

FIG. 4(2) is a schematic representation of the condition resulting from application of a photocurable prepreg FRP sheet to a steel sheet used in an example.

Figure 1:
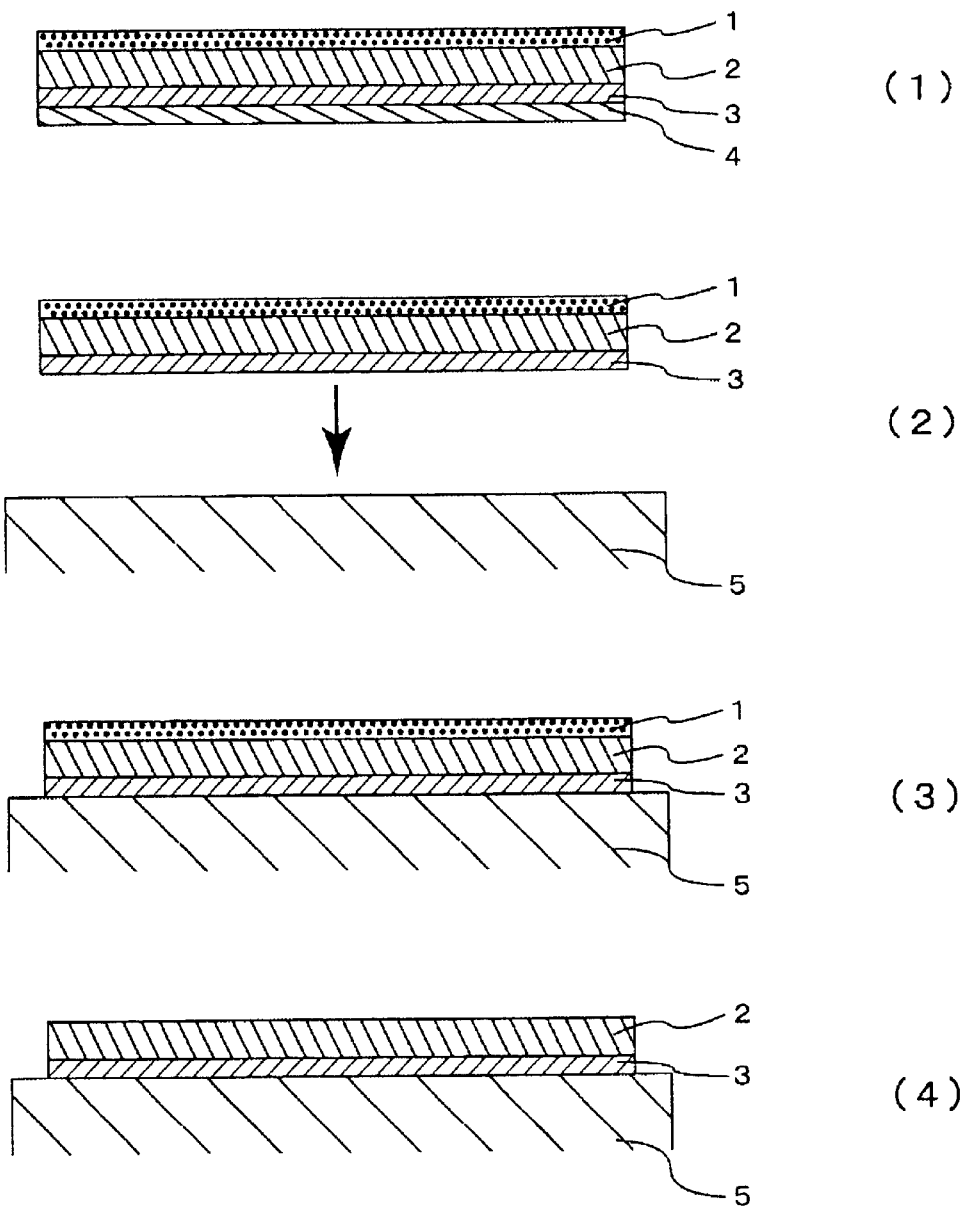
FIG. 1, (1)–(4), is a schematic representation, in cross section, of an embodiment of the multilayer material of the present invention, illustrating the steps from adhering to a substrate to curing thereof.

| | Explanation of symbols |
|---|---|
| 1 | Light-shielding layer (a) |
| 2 | Curable molding material layer (b) |
| 3 | Tacky layer (c) |
| 4 | Releasing layer (d) |
| 5 | Substrate |
| 6 | Joint |
| 7 | Protective layer (e) |

DETAILED DISCLOSURE OF THE INVENTION

In applying a curable molding material, ease of handling of the composition, shortening of operating time and adaptation to substrate surface condition, shape and form, among others, are required. For causing manifestation of sufficient adhesion strength, a step of pretreatment, for example primer treatment, of the substrate, which step requires the technology of coating, prior to application of the curable molding material to the substrate. Thus, there are problems from the viewpoint of ease of handling and operating time.

The present inventors carefully studied the above facts and relations and made intensive investigations and, as a result, revealed the fact that when a multilayer material is constituted in the above manner, dramatic effects are produced, namely a cured layer high in adhesion to various substrates and excellent in strength and durability can be formed in a simple and easy manner without carrying out complicated primer treatment and the material can be used in various fields of application.

In the following, the present invention is described in detail.

The multilayer material according to the invention comprises a light-shielding layer (a), a curable molding material layer (b), a tacky layer (c) and a releasing layer (d).

The above-mentioned light-shielding layer (a), curable molding material layer (b), tacky layer (c) and releasing layer (d) each is a sheet- or film-like lamellar material. The multilayer material may comprise, in addition to the above-mentioned layers, a further lamellar material in the form of a sheet or film between layers and/or on the outer surface of the multilayer material, unless the effects of the invention are weakened or counteracted. These lamellar materials each may comprise one single species or two or more species.

The above multilayer material has the above light-shielding layer (a) on one side of the curable molding material layer (b) and, on the other side, the above-mentioned tacky layer (c) and releasing layer (d) in that order from the inside. Thus, the curable molding material layer (b) has the light-shielding layer (a) on one side thereof for shielding the same from light and, on the other side, the layer (b) has the tacky layer (c) for adhering the same to a substrate and the releasing layer (d) on the outer side of the tacky layer (c) for protecting the tacky layer (c) until working or application of the multilayer material, so that the performance characteristics of the curable molding material layer (b) can be fully produced on various substrates.

Preferably, the above multilayer material further has a protective layer (e) between the light-shielding layer (a) and curable molding material layer (b). Removal of this following curing of the curable molding material layer (b) results in the appearance of a smoother surface on the cured molding material layer (b). On the other hand, before curing of the multilayer material, both faces of the curable molding material layer (b) remain covered with the light-shielding layer (a) and protective layer (e) and with the tacky layer (c) and releasing layer (d) and, during application and curing of the multilayer material, the outer side of the curable molding material layer (b) remains covered with the protective layer (e), so that evaporation of the polymerizable unsaturated monomer and the like occurring in the curable molding material layer (b) is more strongly suppressed and the working environment can be protected from contamination with their odors accordingly, the adhesion/application and curing can be conducted stably and satisfactorily, the workers' health can be prevented from being affected and, furthermore, the curable molding material layer (b) can be prevented from being stained in the step of curing thereof.

The light-shielding layer (a) employed in accordance with the present invention has the effect of shielding the curable molding material layer (b) from light (light-shielding effect) during working and application of the multilayer material so that the workability and applicability of the multilayer material may not be impaired by curing the curable molding material layer (b) during such period. The layer (a) has sufficient flexibility to allow necessary or desired working and application of the multilayer material.

The above light-shielding layer (a) prevents photocuring of the multilayer material, so that a sufficient operating time can be secured. By removal of the light-shielding layer after application, the curable molding material layer (b) can be cured rapidly. As for the level of light shielding, it is not always necessary that all rays of light be shielded. For achieving sufficient preventive effects on the photocuring of the multilayer material, it suffices to make adjustment so that the transmittance of rays in the wavelength range not longer than 500 nm may be reduced to 10% or below.

The figuration of the light-shielding layer (a) is not particularly restricted. For example, the layer may be a film made of paper or a resin material with a light-shielding material vapor-deposited thereon, applied thereto for coating, or dispersed therein. It may be a laminate made of these. Such film made of paper or a resin material with a light-shielding material vapor-deposited thereon may be, for example, a film or the like having, on one side or both sides thereof, a vapor-deposited layer of a metal such as aluminum as a light-shielding material. The film coated with a light-shielding material may be, for example, a film or the like having, on one side or both sides thereof, a coating film or ink layer containing a pigment or the like dispersed therein as a light-shielding material, and the film with a light-shielding material deposited therein may be, for example, a film containing a pigment or the like dispersed therein as a light-shielding material.

The above pigment is not particularly restricted but may be any of those pigments which can provide the film with light-shielding effect, including, for example, carbon black; inorganic pigments such as titanium oxide, iron oxide, zinc oxide, lead oxide, calcium carbonate, barium sulfate, alumina, kaolin clay, talc and mica; metal powders such as aluminum and stainless steel powders; organic pigments such as phthalocyanine blue; milled fibers, coal dust and the like. These may be used singly or two or more of them may be used in combination.

The film mentioned above is not particularly restricted but may be any of those films which have such strength and flexibility as to secure the workability or applicability of the multilayer material and which have durability against monomers and solvents contained in the curable molding material. Thus, it includes, among others, films formed of paper or a resin material.

The paper mentioned above is not particularly restricted but includes, among others, paper species made of natural fibers, synthetic fibers, inorganic fibers and so on. They may be ones surface-treated, for example by silicone treatment, and/or subjected to press finishing, embossing or like processing.

The above resin material is not particularly restricted but includes, among others, polyolefins such as polyethylene, polypropylene, polybutene, polystyrene, and ethylene-α-olefin copolymers; polyesters such as polyethylene terephthalate and polybutylene terephthalate; fluororesins such as tetrafluoroethylene, polyvinylidene fluoride, and poly-monochlorotrifluoroethylene; polybutadiene, polycarbonates, polyacetals, polyamides, polyphenylene ether, polyphenylene sulfide, polyethersulfones, polyurethanes, polyimides, polyetheretherketones, polymethylpentene, ionomer resins, polyvinyl butyral, polyvinyl alcohol, cellulose diacetate, polyvinyl chloride, polyvinylidene chloride, vinyl chloride copolymers, ethylene-vinyl acetate copolymers, ethylene-(meth)acrylic acid copolymers, ethylene-(meth)acrylate ester copolymers, and the like. These may be used singly or two or more of them may be used in combination.

The above film can be produced, for example, by admixing a pigment, an additive and/or the like with the resin material and making the resulting compound into calendered films; extruded films; cast films; T die-extruded films; inflated films; etc. The film may be a stretched film, for example a uniaxially stretched film or a biaxially stretched film.

The vapor-deposited film mentioned above can be produced, for example, by allowing vapor deposition of a metal, such as aluminum, on one or both sides of the film. The above-mentioned coated film can be obtained, for example by coating or printing one or both sides of the film with a coating or ink composition containing a pigment dispersed therein. In these cases, the film surface(s) may be subjected to plasma treatment, corona discharged treatment or chemical treatment, for instance, prior to vapor deposition, coating or printing. The thickness of the light-shielding layer (a) is not particularly restricted but preferably is 5 to 2,000 $\mu$m, for instance. When it is less than 5 $\mu$m, the light-shielding layer (a) may not have a sufficient level of strength to tolerate peeling and, when it exceeds 2,000 $\mu$m, the applicability of the multilayer material may be impaired. A thickness of 10 to 500 $\mu$m is more preferred.

The curable molding material layer (b) according to the invention has, before curing, plasticity and flexibility amply sufficient for working or applying of the multilayer material and, after curing, it acquires sufficient strength and durability, for example sufficient bending strength and bending modulus of elasticity and, according to the resin and filler species, it has sufficient fundamental performance characteristics such as weathering resistance, water resistance, wear resistance and high electric characteristics.

Preferably, the curable molding material layer (b) is free from surface tackiness, which possibly interfere with the process of working or applying.

The figuration of the curable molding material layer (b) is not particularly restricted. For example, the layer may be in the form of a sheet made of a resin composition comprising a curable resin, preferably a prepreg made of a resin composition further comprising a reinforcing fibrous material or filler so that the cured product may have sufficient fundamental performance characteristics. A photocurable sheet made of a resin composition further comprising a photosensitizer is preferred so that the resulting multilayer material can cope with a variety of purpose requirements. Further, a sheet or prepreg sheet made of a resin composition increased in viscosity is preferred. Furthermore, a laminate made by bonding thereto another molding material or materials may also be used.

The above-mentioned curable resin preferably comprises a polymer and a polymerizable unsaturated monomer(s) as essential constituents. The resin composition comprising such curable resin contains other resin composition constituents, such as a curing agent, than the curable resin.

The term "resin composition" as used herein means a composition comprising all the materials constituting the curable molding material layer (b).

The content of the curable resin in the resin composition, which constitutes the multilayer material of the present invention and the weight of which is taken as 100% by weight, is preferably 20 to 95% by weight, more preferably 30 to 80% by weight, still more preferably 30 to 70% by weight. The contents of various compounding ingredients can appropriately be determined based on the curable resin selected for compounding.

The above-mentioned curable resin is not particularly restricted but may be any of those that can be used as molding materials. Thus, it may be a radical-polymerizable resin or a heat-curable resin. The radical-polymerizable resin, for instance, includes unsaturated polyester resins, vinyl ester resins (epoxy acrylate resins), polyester (meth) acrylate resins, (meth)acrylic syrups, and diallyl phthalate resins, among others. As the heat-curable resin, there may be mentioned, among others, epoxy resins, urea resins, melamine resins, and acrylic urethane resins. These may be used singly or two or more of them may be used in combination. Among them, photocurable, radical-polymerizable resins are preferred. Unsaturated polyester resins are more preferred since, when they are used, the workability applicability of the multilayer materials can be improved and the cured products can have sufficient fundamental performance characteristics.

The unsaturated polyester resin to be used is not particularly restricted but may be, for example, a radical-polymerizable resin prepared by dissolving an unsaturated polyester obtained by condensation of an acid component and an alcohol component and having a weight average molecular weight (Mw) of about several hundred to scores of thousands in a polymerizable unsaturated monomer.

The acid component to be used in the unsaturated polyester is not particularly restricted but includes, for example, unsaturated dibasic acids such as maleic acid, maleic anhydride, fumaric acid, itaconic acid, itaconic anhydride, mesaconic acid, citraconic acid, and citraconic anhydride; saturated dibasic acids such as phthalic acid, phthalic anhydride, tetrahydrophthalic acid, tetrahydrophthalic anhydride, hexahydrophthalic anhydride, halogenated phthalic anhydride, isophthalic acid, terephthalic acid, succinic acid, adipic acid, sebacic acid, Het acid, methyltetrahydrophthalic anhydride, and endomethylenetetrahydrophthalic anhydride; at least trifunctional polybasic acids such as trimellitic acid, trimellitic anhydride, pyromellitic acid, and pyromellitic dianhydride. These may be used singly or two or more of them may be used in combination.

The above-mentioned alcohol component is not particularly restricted but includes, for example, glycols such as ethylene glycol, propylene glycol, diethylene glycol, dipropylene glycol, triethylene glycol, neopentyl glycol, 1,3-butanediol, 1,4-butanediol, 1,6-hexanediol, bisphenol A, hydrogenated bisphenol A, bisphenol A-propylene oxide adducts, and bisphenol A-ethylene oxide adducts; at least trifunctional alcohols such as glycerol, trimethylolpropane, and pentaerythritol; and epoxides such as ethylene oxide, propylene oxide, and epichlorohydrin. These may be used singly or two or more of them may be used in combination.

The species and proportions of the acid component and alcohol component in the above unsaturated polyester are not particularly restricted but may appropriately be selected according to the fundamental performance characteristics required of the cured products, among others. It is preferred, however, that an unsaturated dibasic acid account for 5 to 100% by weight of the acid component. The method of causing condensation of the acid component and alcohol component is not particularly restricted but the reaction conditions, such as the reaction temperature and reaction time, for instance, can appropriately be selected. The unsaturated polyester may be modified with any of various modifiers such as diene compounds such as dicyclopentadiene and rubber-like components such as terminally functional butadiene-acrylonitrile copolymers.

The vinyl ester resin to be used is not particularly restricted but may be, for example, a radical-polymerizable resin prepared by dissolving a vinyl ester obtained by addition of a vinylic unsaturated carboxylic acid to the epoxy groups of an epoxy resin in a polymerizable unsaturated monomer.

The epoxy resin to be used is not particularly restricted but may be, for example, of the bisphenol type, novolak type, alicyclic type, or epoxidized polybutadiene type.

The vinylic unsaturated carboxylic acid mentioned above is not particularly restricted but includes, among others, acrylic acid and methacrylic acid.

These may be used singly or two or more of them may be used in combination.

The species and proportions of the epoxy resin and vinylic unsaturated carboxylic acid in the above-mentioned vinyl ester is not particularly restricted but may appropriately be selected according to the fundamental performance characteristics required of the cured products. The method of causing addition polymerization of the epoxy resin and vinylic unsaturated carboxylic acid is not particularly restricted but the reaction conditions, such as the reaction temperature and reaction time, for instance, can appropriately be selected in the same manner as mentioned above.

The above-mentioned polyester (meth)acrylate is, for example, a compound obtained by dehydration condensation of a polyester polyol and (meth)acrylic acid and having a structure such that the main chain skeleton has a polyester structure and (meth)acrylic acid has been introduced into at least one molecular terminus through ester bonding.

The (meth)acrylic syrup to be used is not particularly restricted but may be, for example, a radical-polymerizable resin which is a mixture comprising a (meth)acrylate ester, which is a polymerizable unsaturated monomer, and a (meth)acrylate ester polymer, if necessary further comprising a polymerizable unsaturated monomer other than the (meth)acrylate ester.

The above (meth)acrylate ester is not particularly restricted but includes, among others, methyl (meth)acrylate, ethyl (meth)acrylate, propyl (meth)acrylate, butyl (meth)acrylate, 2-ethylhexyl (meth)acrylate, lauryl (meth)acrylate, cyclohexyl (meth)acrylate, and glycidyl (meth)acrylate. (Meth)acrylamide may also be used. These may be used singly or two or more of them may be used in combination. Among them, methyl methacrylate or a (meth)acrylate ester whose main component is methyl methacrylate is preferred, since the use thereof can lead to further improvements in fundamental performance characteristics, appearance and safety, among others, due to the cured product layer of the multilayer material.

The (meth)acrylate ester polymer mentioned above can be obtained by polymerizing a monomer composition comprising a (meth)acrylate ester and, where necessary, another polymerizable unsaturated monomer. The degree of polymerization thereof is not particularly restricted.

The species and proportions of the (meth)acrylate ester and the (meth)acrylate ester polymer or like polymer in the above-mentioned (meth)acrylic syrup are not particularly restricted but may appropriately be selected according to the fundamental performance characteristics required of the cured products, among others.

The proportions of the polymer and polymerizable unsaturated monomer in the above-mentioned curable resin are not particularly restricted but may appropriately be selected according to the fundamental performance characteristics required of the cured products, among others. In cases where the curable resin is a radical-polymerizable resin, for instance, the mixing ratio of 99/1 to 20/80 is preferred. When the weight proportion of the polymerizable unsaturated monomer is smaller than 99/1, the curability may become poor. When the weight proportion of the polymerizable unsaturated monomer is larger than 20/80, the viscosity of the resin composition may become too low and the composition may become difficult to handle and, further, the fundamental performance characteristics, such as strength features, of the cured products may become poor. More preferably, the mixing ratio is 95/5 to 30/70, still more preferably 90/10 to 40/60.

In cases where the above-described curable resin comprises two or more species of resin, hence is a mixture, the contents of the respective resins are not particularly restricted. When a radical-polymerizable resin is used as the curable resin, it may contain another radical-polymerizable resin than the above-described radical-polymerizable resin.

The polymerizable unsaturated monomer so referred to above means a monomer having a polymerizable unsaturated bond, such as a vinyl monomer or a crosslinking agent, contained in the curable resin.

The above vinyl monomer is not particularly restricted but may be any of those reactive monomers which reacts with the unsaturated groups of the above polymer to form crosslinks in the step of curing. Thus, it includes, for example, styrene, α-methylstyrene, vinyltoluene, chlorostyrene, vinyl acetate, allyl alcohol, ethylene glycol monoallyl ether, propylene glycol monoallyl ether, acrylonitrile, maleimides; unsaturated monocarboxylic acids such as acrylic acid, methacrylic acid and crotonic acid, and monoesters of these unsaturated monocarboxylic acids; unsaturated dicarboxylic acids such as maleic acid, fumaric acid, itaconic acid and citraconic acid, and monoesters of these unsaturated dicarboxylic acids; polyfunctional (meth)acrylates such as ethylene glycol di(meth)acrylate, diethylene glycol di(meth)acrylate, propylene glycol di(meth)acrylate, dipropylene glycol di(meth)acrylate, neopentyl glycol di(meth)acrylate, trimethylolpropane tri(meth)acrylate, and pentaerythritol tetra(meth)acrylate; divinylbenzene, diallyl phthalate, diallyl isophthalate, triallyl cyanurate, and triallyl isocyanurate. These may be used singly or two or more of them may be used in combination. Among them, styrene-containing species are suitably used.

The crosslinking agent mentioned above is not particularly restricted but includes, among others, polyfunctional (meth)acrylates such as ethylene glycol di(meth)acrylate, diethylene glycol di(meth)acrylate, propylene glycol di(meth)acrylate, dipropylene glycol di(meth)acrylate, neopentyl glycol di(meth)acrylate, trimethylolpropane tri(meth)acrylate, and pentaerythritol tetra(meth)acrylate; divinylbenzene, diallyl phthalate, diallyl isophthalate, triallyl cyanurate, and triallyl isocyanurate. These may be used singly or two or more of them may be used in combination.

The total content of the polymerizable unsaturated monomers, such as the vinyl monomer and crosslinking agent, in the above curable resin is not particularly restricted. In cases where the curable resin is a radical-polymerizable resin, for instance, the above content is preferably 1 to 80% by weight based on the total weight of the curable resin. When it is less than 1% by weight, the curability may become poor and, when it exceeds 80% by weight, the resin composition will show an excessively low viscosity, hence become difficult to handle, and the cured products may become inferior in strength and other fundamental performance characteristics. It is more preferably 5 to 70% by weight, still more preferably 10 to 60% by weight.

The curing agent in the above resin composition is preferably a photosensitizer capable of providing the resin with photocurability, among others.

The photosensitizer is not particularly restricted but includes, among other, visible light photoinitiators having photosensitivity in the visible light range, such as those described by Yamaoka in "Hyomen (Surface)", 27 [7] (1989), page 548 or by Sato in the "Abstracts of Papers read at the Third Polymer Material Forum" (1994), IBP18, for instance. Such visible light photoinitiators are preferably used.

Such photosensitizers may be used singly or two or more of them may be used in combination. "Photosensitizers" are sometimes referred to also as photocuring agents in some instances and, in the present description, "photosensitizers" and "photocuring agents" are collectively referred to as "photosensitizers".

The visible light photoinitiator to be used is not particularly restricted but may be any of those photopolymerization initiators which have photosensitivity in the wavelength range of 380 to 780 nm, among others. Thus, mention may be made of, for example, carbonyl compounds such as benzoin, benzoin methyl ether, benzoin ethyl ether, benzoin isopropyl ether, benzoin isobutyl ether, α-methylbenzoin, α-phenylbenzoin, benzil, diacetyl, anthraquinone, methylanthraquinone, chloroanthraquinone, camphor quinone, acetophenone, acetophenone benzil, dimethoxyacetophenone, dimethoxyphenylacetophenone, diethoxyacetophenone, benzyl dimethyl ketone, benzophenone, and trimethylbenzoyldiphenylphosphine oxide; sulfur-containing compounds such as diphenyl sulfide, diphenyl disulfide, diphenyl sulfide, dithiocarbamates, and methylthioxanthone; halogenated polycyclic condensed ring hydrocarbons such as α-chloromethylnaphthalene; dyes such as acrylflavin and fluorescein; metal salts such as uranyl nitrate, iron chloride, and silver chloride; onium salts such as p-methoxybenzenediazonium, hexafluorophosphate, diphenyliodonium salts and tripheylsulfonium salts; and dicyclopentadienyltitanium-di (pentafluorophenyl). Mention may also be made of such known composite initiators as organic peroxide/dye systems, diphenyliodonium salt/dye systems, imidazole/keto compound systems, hexaarylbiimidazole compound/hydrogen-donating compound systems, mercaptobenzothiazole/thiopyrylium salt systems, metal arene/cyanine dye systems, and hexaarylbiimidazole/radical initiator systems described in Japanese Kokoku Publication Sho-45-37377.

Furthermore, a wide-range photosensitizer having sensitivity in the range from the ultraviolet region to visible region may also be used as the above-mentioned photosensitizer. As such photosensitizer, there may be mentioned, for example, acylphosphine oxide compounds such as bis(2,6-dimethoxybenzoyl)-2,4,4-trimethylpentylphosphine oxide, bis(2,4,6-trimethylbenzoyl)-methylphosphine oxide, 2,4,6-trimethylbenzoyl-diphenylphosphine oxide and 2,6-dimethoxybenzoyl-diphenylphosphine oxide. As such, use may be made of commercial products such as Irgacure 1700 (trademark, product of Ciba Specialty Chemicals), which is a 75/25 (by weight) mixture of Darocur 1173 (trademark, product of Ciba Specialty Chemicals; 2-hydroxy-2-methyl-1-phenylpropan-1-one) and bis(2,6-dimethoxybenzoyl)-2,4,4-trimethylpentylphosphine oxide (product of Ciba Specialty Chemicals); Irgacure 1800 (trademark, product of Ciba Specialty Chemicals), which is a 75/25 (by weight) mixture of Irgacure 184 (trademark, product of Ciba Specialty Chemicals; 1-hydroxycyclohexyl phenyl ketone) and bis(2,6-dimethoxybenzoyl)-2,4,4-trimethylpentylphosphine oxide (trademark, product of Ciba Specialty Chemicals), or Irgacure 1850 (trademark, product of Ciba Specialty Chemicals), which is a corresponding 50/50 (by weight) mixture; Irgacure 819 (trademark, product of Ciba Specialty Chemicals; bis(2,4,6-trimethylbenzoyl)-phenylphosphine oxide); Lucirin TPO (trademark, product of BASF; 2,4,6-trimethylbenzoyl-diphenylphosphine oxide); and Darocur 4265 (trademark, product of Ciba Specialty Chemicals), which is a 50/50 (by weight) mixture of Darocur 1173 (trademark, product of Ciba Specialty Chemicals; 2-hydroxy-2-methyl-1-phenylpropan-1-one) and Lucirin TPO.

The level of addition of the above photosensitizer is not particularly restricted but preferably is, for example, 0.01 to 10 parts by weight per 100 parts by weight of the curable resin. When it is lower than 0.01 part by weight, the photocurability of the curable molding material layer (b) may become poor. When it exceeds 10 parts by weight, the fundamental performance characteristics of the cured product may become deteriorated. A level of 0.05 to 8 parts by weight is more preferred, and a level of 0.1 to 5 parts by weight is still more preferred.

The above resin composition may further contain a heat curing agent or the like. In such a case, the curable molding material layer (b) has heat curability.

The heat curing agent is not particularly restricted but includes, for example, organic peroxides such as benzoyl peroxide; lauroyl peroxide, methyl ethyl ketone peroxide, tert-butyl peroxy-2-ethylhexanoate, tert-butyl peroxyoctoate, tert-butyl peroxybenzoate, cumene hydroperoxide, cyclohexanone peroxide, dicumyl peroxide, bis(4-tert-butylcyclohexyl)peroxydicarbonate, and 1,1-bis (tert-hexylperoxy)-3,3,5-trimethylcyclohexane; azo compounds such as 2,2'-azobisisobutyronitrile and 2-phenylazo-2,4-dimethyl-4-methoxyvaleronitrile; and other radical polymerization initiators.

The level of addition of the above heat curing agent is not particularly restricted but preferably is, for example, 0 to 10 parts by weight per 100 parts by weight of the curable resin. When it exceeds 10 parts by weight, the fundamental performance characteristics of the cured product may become deteriorated. A level of 0.01 to 8 parts by weight is more preferred, and a level of 0.05 to 5 parts by weight is still more preferred. It is possible to use such photosensitizer and such heat curing agent in combination.

The above resin composition may further contain one or more of shrinkage reducing agents, internal release agents, chain transfer agents, polymerization inhibitors, ultraviolet absorbers, viscosity reducing agents, coupling agents, thickening agents, colorants, antimicrobial agents and other additives, and halogen-based, phosphorus-based or other inorganic flame retardants. Each of them may be used singly or two or more of them may be used in combination.

When the curable molding material layer (b) is of the photocurable type, it is preferred that the additives to be used and the addition levels thereof be selected so that the photocurability may not be impaired.

The shrinkage reducing agents mentioned above are not particularly restricted but include, for example, thermoplastic polymers such as polyethylene, polypropylene, polystyrene, three-dimensionally crosslinked polystyrene, polymethyl methacrylate, polyethylene glycol, polypropylene glycol, cellulose butyrate, cellulose acetate (acetylcellulose), polyvinyl chloride, polyvinyl acetate, polycaprolactone, and saturated polyesters.

The level of addition of the shrinkage reducing agents is not particularly restricted but preferably is, for example, 0 to 30 parts by weight per 100 parts by weight of the curable resin. When it exceeds 30 parts by weight, the strength and other fundamental performance characteristics of the curd product may become poor. A level of 0 to 15 parts by weight is more preferred.

The above-mentioned internal release agents are not particularly restricted but include, among others, silicone resins and stearic acid salts.

The level of addition of the internal release agents is not particularly restricted but preferably is, for example, 0 to 10 parts by weight per 100 parts by weight of the curable resin. When it exceeds 10 parts by weight, the fundamental performance characteristics of the cured product may become poor. A level of 0 to 5 parts by weight is more preferred.

The above-mentioned chain transfer agents are not particularly restricted but include, for example, α-methylstyrene dimer; carbon tetrachloride; alkylmercaptans such as tert-butylmercaptan, n-octylmercaptan, and n-dodecylmercaptan; aromatic mercaptans such as thiophenol and thionaphthol; thioglycolic acid; thioglycolic acid alkyl esters such as octyl thioglycolate, ethylene glycol dithioglycolate, trimethylolpropane tris(thioglycolate), and pentaerythritol tetrakis(thioglycolate); β-mercaptopropionic acid; and β-mercaptopropionic acid alkyl esters such as octyl β-mercaptopropionate, 1,4-butanediol di(β-thiopropionate), and pentaerythritol tetrakis (β-thiopropionate).

The level of addition of the chain transfer agents is not particularly restricted but preferably is, for example, 0 to 5 parts by weight per 100 parts by weight of the curable resin. When it exceeds 5 parts by weight, the curability of the curable resin may become poor. A level of 0 to 2 parts by weight is more preferred.

The above-mentioned polymerization inhibitors are not particularly restricted but include, for example, p-tert-butylcatechol, p-methoxyphenol, hydroquinone, p-benzoquinone, chloranil, m-dinitrobenzene, nitrobenzene, p-phenylenediamine, sulfur, diphenylpicryl hydrazyl, di-p-fluorophenylamine, and tri-p-nitrophenylmethyl.

The level of addition of the polymerization inhibitors is not particularly restricted but preferably is, for example, 0 to 5 parts by weight per 100 parts by weight of the curable resin. When it exceeds 5 parts by weight, the curability of the curable resin may become poor. A level of 0.001 to 2 parts by weight is more preferred.

The above-mentioned ultraviolet absorbers are not particularly restricted. Thus, those of the benzophenone type or benzotriazole type which can be used in the curable resin can be used. The above-mentioned viscosity reducing agents or coupling agents are not particularly restricted, either, but those which can be used in the curable resin can be used. The level of addition of each of them is not particularly restricted but preferably is, for example, 0 to 5 parts by weight per 100 parts by weight of the curable resin. When it exceeds 5 parts by weight, the curability of the curable resin may become poor. A level of 0.05 to 2 parts by weight is more preferred.

The above-mentioned thickening agents are not particularly restricted but include, for example, polyvalent metal oxides such as magnesium oxide, calcium oxide, and zinc oxide; polyvalent metal hydroxides such as magnesium hydroxide and calcium hydroxide; and polyfunctional isocyanates.

The level of addition of the thickening agents is not particularly restricted but, in the case of polyvalent metal oxides or hydroxides, it is preferably, for example, 0.1 to 10 parts by weight, more preferably 0.5 to 5 parts by weight, per 100 parts by weight of the curable resin. In the case of polyfunctional isocyanates or the like, it is preferably 1 to 30 parts by weight, more preferably 3 to 20 parts by weight, still more preferably 5 to 15 parts by weight, per 100 parts by weight of the curable resin. When the addition level is below the lower limit, the viscosity of the resin composition may not be increased and, when it exceeds the upper limit, the resin composition may become excessively viscous. For attaining appropriate thickening, the so-called maturation step is taken in which the thickening agent-containing resin composition is maintained at ordinary temperature or under warming for a certain period of time for allowing the thickening reaction to proceed.

In cases where a polyvalent metal oxide or hydroxide is used as the thickening agent, a succinic acid derivative containing 8 to 30 carbon atoms in total can be used as a thickening adjusting agent, if necessary. The use of such succinic acid derivative makes it possible to produce a thickening accelerating effect in synergy with an appropriate water content in the mechanism of thickening based on the acid-metal salt interaction involving the polyvalent metal oxide or hydroxide and thus makes it possible to form the curable molding material layer (b) while retaining the proper state of distribution of reinforcing fibers such as glass fibers. As a result, it becomes possible to form the curable molding material layer (b) with a more appropriate distribution of glass fibers or the like in the layer as compared with the conventional SMCs (sheet molding compounds) without uneven distribution of the glass fibers or the like and thus improve the value of the multilayer material as a commercial good.

The above-mentioned succinic acid derivative specifically includes, for example, octylsuccinic acid, octenylsuccinic acid, hexylsuccinic acid, hexenylsuccinic acid, nonylsuccinic acid, nonenylsuccinic acid, decylsuccinic acid, decenylsuccinic acid, dodecylsuccinic acid, dodecenylsuccinic acid, teteradecylsuccinic acid, tetradecenylsuccinic acid, cyclododecylsuccinic acid, cyclododecenylsuccinic acid, hexadecylsuccinic acid, hexadecenylsuccinic acid, heptadecylsuccinic acid, heptadecenylsuccinic acid, octadecylsuccinic acid, octadecenylsuccinic acid, eicosylsuccinic acid, eicosenylsuccinic acid, diphenylbutenylsuccinic acid, pentadodecylsuccinic acid, pentadodecenylsuccinic acid, and salts of these. These succinic acid derivatives may be used singly or two or more of them may be used in appropriate combination. The method of synthesizing such succinic acid derivatives is not particularly restricted.

The level of addition of the succinic acid derivatives depends on the species and/or combination thereof but preferably is within the range of 0.01 to 10 parts by weight, more preferably 1 to 10 parts by weight, per 100 parts by weight of the curable resin. When the succinic acid derivative addition level is below 0.01 part by weight, the desired effect resulting from the use of such a succinic acid derivative will scarcely be obtained. Namely, the initial viscosity of the resin composition becomes excessively high, and this is undesirable since the reinforcing fiber can no more satisfactorily impregnated with the resin composition. When the succinic acid derivative addition level is higher than 10 parts by weight, the initial viscosity of the resin composition can be suppressed to a low level but the water resistance and other physical properties are unfavorably diminished.

For increasing the rate of thickening, the water content, as an auxiliary to the thickening adjusting agent, in the resin composition is preferably adjusted to a level within the range of 0.1% by weight to 0.45% by weight, more preferably 0.12% by weight to 0.42% by weight, still more preferably 0.15% by weight to 0.4% by weight. In other words, the water content of the resin composition is preferably not less than 0.1% by weight but not more than 0.45% by weight, more preferably not less than 0.12% by weight but not more than 0.42% by weight, still more preferably not less than 0.15% by weight but not more than 0.4% by weight. When the water content is less than 0.1% by weight, the expected effects will be produced only poorly and, when it is above 0.45% by weight, the water resistance and other physical properties may unfavorably become poor.

When these are combined, it becomes possible to curtail the maturation process by causing the thickening reaction to proceed in the resin composition at 60° C. to 100° C.

The colorants mentioned above are not particularly restricted but include, for example, those inorganic pigments, organic pigments and toners which can be used in the curable resin.

The above-mentioned antimicrobial agents are not particularly restricted but may be, for example, any of those which can be used in the curable resin.

The level of addition of each of the above-mentioned colorants and antimicrobial agents is not particularly restricted but preferably is, for example, 0 to 10 parts by weight, more preferably 0.1 to 5 parts by weight, per 100 parts by weight of the curable resin.

When the above resin composition contains a reinforcing material, such as a reinforcing fiber or filler, the resin and reinforcing material constitute a composite, whereby the curable molding material layer (b) becomes excellent in strength and other fundamental performance characteristics.

The reinforcing fiber mentioned above is not particularly restricted but includes, among others, inorganic fibers such as glass fibers, carbon fibers, metal fibers, and ceramic fibers; organic fibers such as aramide, polyester, vinylon, phenol and Teflon fibers; and natural fibers. These fibers are not particularly restricted in their form or shape but may be, for example, in the form of cloths (woven cloths); mats such as chopped strand mats, preformable mats, continuous strand mats, and surfacing mats; chopped strands; rovings; and nonwoven fabrics. These may be used singly or two or more of them may be used in combination. Among them, glass fibers are preferred.

The reinforcing fibers are used preferably in an amount of 5 to 100 parts by weight per 100 parts by weight of the curable resin, for instance. When they are used in an amount less than 5 parts by weight or in excess of 100 parts by weight, the fundamental performance characteristics of the cured product may possibly be deteriorated. An amount of 10 to 65 parts by weight is more preferred.

By saying, in the present description, that the resin composition contains a reinforcing fiber, it is meant, among others, that the reinforcing fiber is mixed in with the resin composition or that the reinforcing fiber is impregnated with the resin composition.

The above-mentioned fillers are not particularly restricted but include, for example, inorganic fillers such as aluminum hydroxide, calcium carbonate, calcium sulfate, barium sulfate, alumina, clay, talc, glass powder, milled fibers, cristobalite, silica (silica sand), river sand, diatomaceous earth, mica powders, gypsum, and glass powders; and organic fillers. These may be used singly or two or more of them may be used in combination. Among these, fillers comprising aluminum hydroxide as an essential component are preferred since they can contribute to improvements in mechanical property and other fundamental performance characteristics of the cured product. In a preferred mode of embodiment, aluminum hydroxide is used since it can provide the resin composition with flame retardancy. For use in those fields where wear resistance is required, cristobalite, silica, river sand and the like are preferred. Among these fillers, finely divided glass and/or frit with a light transmittance in the wavelength range of 400 to 500 nm of not less than 30% and a mean particle size of 50 to 1,000 micrometers is preferred as a filler capable of producing a coloring effect without reducing the photocurability of the multilayer material. A light transmittance of less than 30% is unfavorable since it causes a marked decrease in photocurability. When the mean particle size is smaller than 50 micrometers is undesirable since the propagation of light will then become poor, hence the effect of maintaining the photocurability at a desired level will become decreased. When it is larger than 1,000 micrometers, it unfavorably becomes difficult to attain uniform dispersion of the filler. Thus, it is suitable to select the filler according to the intended use of the multilayer material.

The fillers described above are used preferably in an amount of 0 to 300 parts by weight per 100 parts by weight of the curable resin, for instance. When the amount exceeds 300 parts by weight, the flowability of the resin composition becomes poor and the workability in the formation of the curable molding material layer (b) may decrease. A range of 30 to 280 parts by weight is more preferred.

The curable molding material layer (b) can be obtained, for example, by the method comprising blending the above-mentioned components and making the resulting resin-based mixture solution into an SMC (sheet molding compound). Such method is not particularly restricted but can be carried out, for example, by coating a carrier film with the resin-based mixture solution, then spraying or loading the same with a reinforcing fiber and sandwiching the fiber between the carrier film and another sheet of carrier film coated with the resin-based mixture solution or by spraying or loading a carrier film with a reinforcing fiber, then coating the same with the resin-based mixture solution and, after contact bonding, impregnation, etc., subjecting the resulting sheet to maturation and thickening reaction.

In preparing the curable molding material layer (b), the viscosity of the resin-based mixture solution is not particularly restricted but is preferably adjusted in an appropriate manner according to the intended use of the multilayer material. For example, the multilayer material of the invention can be applied to substrates diversified in shape and form, e.g. planar, three-dimensionally curved, and uneven surfaces. For the multilayer material to be more appropriately adapted to these various substrate shapes or forms, namely for the multilayer material to be not only applicable to planes but also sufficiently adapted to three-dimensionally curved or uneven or like surfaces, it is preferred that the material be in the form of a flexible sheet, hence the curable molding material layer (b) is preferably prepared so that it may have flexibility. When, in this case, the amount of the thickening agent is reduced, the viscosity of the resin composition becomes low and the flexibility of the curable molding material layer (b) is thereby improved but the thickening rate becomes slow, possibly making it impossible to take up the sheet comprising the curable molding material layer (b) produced. Thus, the above-described thickening adjusting agent having a fast-thickening effect is preferably used, optionally together with said auxiliary agent, to thereby make it possible to take up the sheet produced, which leads to facilitation of the multilayer material production. Meanwhile, in SMC production, the maturation step is generally carried out after taking up, so that an external force due to taking up, for instance, is exerted on the multilayer material before maturation. On that occasion, when the viscosity of the resin composition is low, troubles may arise, for example uneven distribution of the reinforcing fiber (e.g. glass fiber), shrinkage of the sheet, and bubble formation due to intrusion of air. Therefore, it is recommended that the multilayer material be produced by taking up the sheet comprising the curable molding material layer (b) after the step of increasing the viscosity of the resin composition at 60 to 100° C. By this, it becomes possible to produce the multilayer material in a condition capable of being adapted to various substrate forms.

The thickness of the curable molding material layer (b) is not particularly restricted but preferably is, for example, 0.1 to 10 mm. When it is less than 0.1 mm, the cured product may fail to have sufficient strength. When it exceeds 10 mm, the workability and applicability of the multilayer material may decrease and the photocurability of the curable molding material layer (b) may decrease, too. A more preferred thickness is 0.5 to 5 mm.

The tacky layer (c) according to the invention shows sufficient adhesiveness to the substrate to which the multilayer material is to be applied, and has sufficient flexibility to allow satisfactory application of the multilayer material.

Owing to the above tacky layer (c), the multilayer material shows close bonding to the substrate and, after bonding, the curable molding material layer (b) and tacky layer (c) show shape-retaining properties. Further, owing to the strength of the binder itself, the close bonding to the curable molding material layer (b) after curing, and the close bonding to the substrate, excellent adhesion strength is obtained.

The figuration of the tacky layer (c) is not particularly restricted but generally includes, among others, films formed by a binder layer having a supporting member. The tacky layer may also have the form of a laminate comprising two or more films.

The supporting member mentioned above is a film-like or sheet-like lamellar body used to improve the shape-retention, strength and handleability, among others, of the tacky layer. It may be, for example, a film made of paper or a resin material, a woven or nonwoven fabric made of a fibrous material, such as a natural fiber, synthetic fiber, and/or inorganic fiber, or a foamed body. It may be in the press-finished, embossed or-otherwise processed form.

The above binder layer comprises a binder.

The binder is not particularly restricted but includes, among others, rubber-based binders whose main component is a synthetic rubber, such as a styrene-butadiene rubber, isobutylene rubber, isoprene rubber or butyl rubber, and/or a natural rubber; and synthetic resin-based binders whose main component is, for example, an acrylic resin, polyvinyl alcohol, polyacrylamide, polyvinyl methyl ether, a styrene-isoprene block copolymer, a styrene-butadiene block copolymer, a styrene-ethylene-butylene block copolymer, or an ethylene-vinyl acetate copolymer. These may be of the solution, emulsion, hot melt, or water-soluble type, for instance. They may be used singly or two or more of them may be used in combination. Among them, acrylic binders are preferred.

The above-described binder may contain, if necessary, one or more of tackifiers, plasticizers and the additives described above. These may respectively be used singly or in combination.

The above-mentioned tackifiers and plasticizers are not particularly restricted but include those generally used in adhesive compositions. As the tackifiers, for instance, there may be mentioned natural resins such as rosin and terpene resins; petroleum hydrocarbon resins such as chroman-indene resins; phenol resins; and xylene resins. As the plasticizers, there may be mentioned petroleum-based plasticizers such as process oils; liquid rubber plasticizers such as liquid polyisobutylene and liquid polybutene; resin type plasticizers such as dibasic acid esters.

The binder layer may further contain a filler, a flame retardant and/or the like. Each of these may comprise one single species or a combination of two or more species. When the binder layer contains a filler and/or a flame retardant, the heat resistance and/or flame retardancy of the tacky layer (c) is improved.

The above-mentioned filler is not particularly restricted but may be any of those mentioned hereinabove. Among them, aluminum hydroxide is preferably used.

The flame retardant is not particularly restricted but may be, for example, a halogen-containing flame retardant; a phosphorus-containing flame retardant; or a halogen-free flame retardant such as an inorganic flame retardant. The use of a halogen-free flame retardant, which will not cause environmental pollution, is preferred among others.

The above filler and/or flame retardant is used preferably in an amount of, for example, 0 to 100 parts by weight, more preferably 20 to 80 parts by weight, per 100 parts by weight of the adhesive. When the amount of the filler and/or flame retardant exceeds the above range, the adhesiveness of the tacky layer (c) may decrease.

Preferably, the tacky layer (c) has curability and, in that case, the adhesion strength can be further improved.

The method of providing the tacky layer (c) with curability is not particularly restricted but preferably comprises, for example, incorporating the curable resin and photosensitizer mentioned above, for instance, in the binder to render the same photocurable. In this case, for improving the strength of the tacky layer (c), a polyfunctional (meth)acrylate is preferably used as the polymerizable unsaturated monomer in the curable resin. In these cases, when the polymerizable unsaturated monomer, such as styrene, contained in the curable molding material layer (b) migrates to the tacky layer (c), that polymerizable unsaturated monomer contributes to curing of the tacky layer (c) to enable sufficient curing of the tacky layer (c).

Further, in a preferred mode of embodiment for providing the tacky layer (c) with curability when the curable molding material layer (b) comprises a resin composition containing a curable resin comprising a polymer and a polymerizable unsaturated monomer as essential constituents, the tacky layer (c) has no supporting member interrupting the migration of the polymerizable unsaturated monomer and/or the like. In such case, since the polymerizable unsaturated monomer will not be prevented from penetrating into the tacky layer (c) by any supporting member, the tacky layer (c) acquires a constitution such that the whole layer (c) uniformly contains the polymerizable unsaturated monomer and the binder and polymerizable unsaturated monomer are cured integrally, so that the tacky layer (c) becomes rigid and stiff and the layer (c) as a whole acquires sufficient adhesion strength, heat resistance, flame retardancy and durability, among others. The multilayer material, when it contains such a tacky layer (c), shows sufficient flexibility in the step of application and, when it is adhered to a substrate, the tacky layer (c) is uniformly swollen with the polymerizable unsaturated monomer and, thereby, the close bonding thereof to the substrate is enhanced and the adhesion strength is improved, so that distortion hardly occurs between the curable molding material layer (b) and tacky layer (c) or between the substrate and tacky layer (c) and, further, the material will be hardly separated or peeled off from the substrate. Furthermore, since the tacky layer (c) as a whole is cured integrally, such trouble as separation of the material from the supporting member by internal fracture of the tacky layer (c) will not occur.

As the form of the adhesive layer in the above mode of embodiment, there may be mentioned, for example, (I) a film formed of the binder layer without any supporting member, and (II) a film formed of the binder layer having a supporting member permeable to the polymerizable unsaturated monomer, for example paper or a nonwoven fabric. A laminate comprising these may also be used. The above form (I) can be used as a transfer tape, and the resin to be used therein preferably contains a resin improved in molecular weight and degree of crosslinking. The multilayer material then shows improved adaptability in response to the surface shape of the substrate and thus can be applied with ease, so that sufficient adhesion strength can be stably attained. The form (II) is preferred in view of the improvements producible therewith in strength of the tacky layer (c), in shape retentivity, and in workability in the step of cutting the multilayer material for application. From the viewpoint of adaptability of the multilayer material in response to the substrate surface condition or shape, the use of paper or a nonwoven fabric is preferred.

The thickness of the tacky layer (c) is not particularly restricted but preferably is, for example, 3 µm to 10 mm. When it is less than 3 µm, the adhesion of the multilayer material to the substrate may not be prevented from becoming poor. When it exceeds 10 mm, the workability and applicability of the multilayer material decrease and the fundamental performance characteristics of the multilayer material may be deteriorated. A more preferred thickness is 10 µm to 5 mm.

Before curing of the multilayer material, the tacky layer (c) retains adhesiveness for close bonding of the tacky layer to the curable molding material layer and substrate and, after curing of the multilayer material, form an adhesive layer and exhibits adhesiveness for permanent adhesion of the curable molding material layer to the substrate. In this manner, the tacky layer of the multilayer material before curing forms, after curing of the multilayer material, an adhesive layer. Since both roles of the layer are thus distinguishable, the layer (c) before curing of the multilayer material is a "tacky layer", and the ability to closely bond the curable molding material layer to the substrate is termed hereinafter "tackiness strength", whereas, after curing of the multilayer material, it becomes an "adhesive layer" and the ability to retain permanent bonding of the curable molding material layer to the substrate is termed "adhesion strength".

Referring to the multilayer material, the adhesion strength of the adhesive layer formed by the tacky layer (c) after test curing is preferably within the range of 20 to 2,000 N/cm². When it has such adhesion strength, the multilayer material of the invention becomes excellent in applicability, can satisfactorily be prevented from becoming poor in adhesion to various substrates, gives cured products having sufficient fundamental performance characteristics, with improved adhesion strength and durability, and can be adapted properly in response to the field of application.

The term "test curing" as used herein means the curing to be performed under the conditions described below for determining the adhesion strength attainable upon curing of the multilayer material of the present invention. The adhesion strength of the adhesive layer so referred to above means the adhesion strength of the adhesive layer formed by the tacky layer (c) after such test curing of the multilayer material.

For determining the adhesion strength produced upon curing of the multilayer material of the invention, the tacky layer (c) side of the multilayer material is brought into contact with a substrate, a force of 5 kgf is applied to the assembly for 10 seconds to cause the multilayer material to adhere to the substrate. Thereafter, when the curable molding material constituting the multilayer material is of the heat-curable type, the assembly is maintained at a curing temperature, which is equal to the 10-hour half-life temperature of the curing agent plus 30° C., for 5 hours and then further allowed to stand at 23° C. and 65% RH for 24 hours, and the adhesion strength of the adhesive layer formed by the tacky layer (c) is measured. When the curable molding material constituting the multilayer material is of the photocurable type, the multilayer material is irradiated with ultraviolet rays, using an Ushio Denki ultraviolet irradiation system, UV152/1MNLC-3-AA01, and a metal halide lamp, UVL-1500M2-N (emission length 125 mm, 1 kW), from a distance of 30 cm for 2 hours and then further allowed to stand at 23° C. and 65% RH for 24 hours and, thereafter, the adhesion strength of the adhesive layer formed by the tacky layer (c) is measured.

In the above adhesion strength measurement, steel products prescribed in JIS G 3141 are surface-treated by the method prescribed in JIS K 6948 and then used as test panels, namely substrates.

For the above adhesion strength measurement, the multilayer material cut to a width of 25 mm is attached to the test panel by means of the tacky layer (c) with an overlapping length of 25 mm, and the assembly is subjected to test curing and then subjected to testing according to JIS Z 0237.

A tensile tester according to JIS B 7721 is used as the test apparatus.

Figure 5:
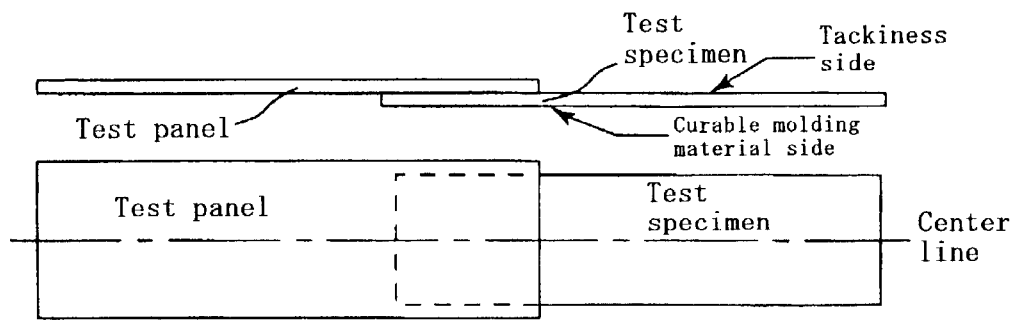
FIG. 5 is a schematic representation showing a side view and a top view of the test specimen for a shear adhesion strength test.

Three test specimens as shown in FIG. 5 are prepared.

As for the test method, the grip distance on the tensile tester is 100 mm, and the test specimen is pulled at a rate of 10 mm/minute and the force P (N) required for separating the test specimen is determined.

The shear adhesion strength is calculated according to the formula given below, and the mean value of three test specimens is reported.

$$T1 = (100 \times P1)/(W1 \times L1)$$

T1: shear adhesion strength [N/cm²]
P1: maximum load at rupture [N]
W1: test specimen width [mm]
L1: adhered part length [mm].

Figure 6:
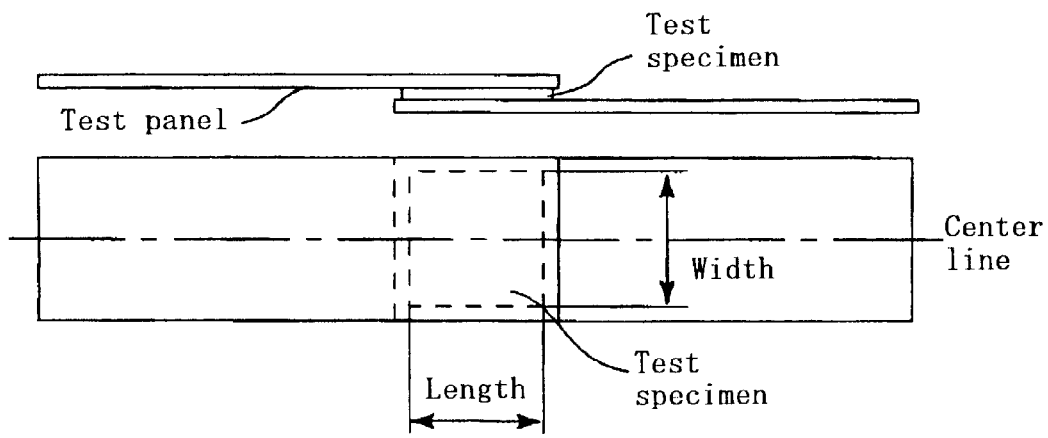
FIG. 6 is a schematic representation showing a side view and a top view of the test specimen for a shear tackiness strength test.

Simultaneously, for determining the tackiness strength intrinsic in the tacky layer (c) of the multilayer material of the invention, a test specimen as shown in FIG. 6 was prepared using a double coated adhesive tape having the same constitution as the tacky layer (c) and tested in the same manner. Thus, the double coated adhesive tape, cut to a size of 25 mm×25 mm, was sandwiched between two test panels, the assembly was pressed under a force of 5 kgf for 10 seconds and then allowed to stand at 23° C. and 65% RH for 24 hours and, thereafter, subjected to tackiness strength testing.

The shear tackiness strength is calculated according to the formula given below, and the mean value of three test specimens is reported.

$$T2=(100\times P2)/(W2\times L2)$$

T2: shear tackiness strength [N/cm$^2$]
P2: maximum load at rupture [N]
W2: test specimen width [mm]
L2: adhered part length [mm].

The tackiness strength of the tacky layer (c) before curing of the multilayer material is 2 to 150 N/cm$^2$, and this tackiness strength is sufficient for the multilayer material pressed against a substrate to retain its figuration in close contact with the substrate and, prior to pressing, allows the multilayer material to be moved or shifted relative to the substrate for the purpose of adjustment, for instance.

After curing, the multilayer material shows an adhesion strength of 20 to 2,000 N/cm$^2$, which is much higher than the tackiness strength intrinsic in the tacky layer (c) and makes it difficult for such a trouble as separation from the substrate with the lapse of time to occur and thus enhances the durability of the reinforcing effect.

When the adhesion strength is below 20 N/cm$^2$, it shows no significant difference as compared with the case where a reinforcing layer having the same shape as the substrate is caused to adhere to the substrate by means of a double coated tape, and the durability becomes insufficient. When the above adhesion strength exceeds 2,000 N/cm$^2$, the tacky layer (c)-derived adhesive layer becomes too rigid and such a trouble as warpage unfavorably occurs after the lapse of time.

The releasing layer (d) according to the invention protects the tacky layer (c) during working of the multilayer material, produces an effect of enabling the tacky layer (c) to separate from the releasing layer (d) while maintaining the tackiness of the tacky layer (c)(releasing property), and has flexibility enabling satisfactory application of the multilayer material.

The figuration of the releasing layer (d) is not particularly restricted but includes, among others, paper, films made of such a resin material as mentioned above, for example polyethylene or polypropylene; films made of a metallic material such as aluminum foil and treated with a releasing agent.

The releasing agent mentioned above is not particularly restricted but includes, for example, those whose main component is a silicone resin, fluororesin, polyethylene wax or like releasing resin. These may be used singly or two or more of them may be used in combination.

The releasing layer can be formed, for example, by applying such releasing agent to one side of a supporting member such as a film or paper. In such case, the film surface may be subjected to plasma treatment, corona discharge treatment, chemical treatment or some other appropriate treatment prior to releasing agent application.

The thickness of the releasing layer (d) is not particularly restricted but preferably is, for example, 3 to 2,000 µm. When it is less than 3 µm, the releasing layer (d) may not have sufficient release characteristics and, when it exceeds 2,000 µm, the workability and applicability of the multilayer material may become poor. A more preferred thickness is 10 to 500 µm.

The releasing layer (d) preferably has light-shielding capacity so that it, together with the light-shielding layer (a), may shield both sides of the curable molding material layer (b) from light to thereby improve the workability and applicability and adhesiveness of the multilayer material and satisfactorily suppress the occurrence of poor adhesion. As for the level of light shielding, it is not always necessary to shield all light rays, like the light-shielding layer (a). It suffices if the light transmittance in the range of wavelengths not longer than 500 nm is adjusted to 10% or below.

The method of providing the releasing layer (d) with light shielding effect is not particularly restricted but may comprise, for example, using a light-shielding film or paper.

After application of the multilayer material and curing of the curable molding material layer (b), the protective layer (e) according to the invention is either peeled off or allowed to remain, without being peeled off, as a permanent protective layer for the multilayer material. When it is to be peeled off, it has releasing properties against the curable molding material layer (b) and has sufficient flexibility to allow satisfactory application of the multilayer material.

The figuration of the protective layer (e) to be peeled off is not particularly restricted but mention may be made of, for example, an odor-shielding film made of a resin material, an odor-shielding film formed of a metallic material such as aluminum foil, or a laminated film comprising such a film and another film bonded together.

The resin material for forming the above odor-shielding film is not particularly restricted but may be any of those resins which render the protective layer (e), which is to be peeled off, scarcely permeable to the polymerizable unsaturated monomer contained in the curable molding material layer (b). Thus, polyamide resins such as nylon species; polyesters such as polyethylene terephthalate and polybutylene terephthalate; polyvinyl chloride, polyvinylidene chloride, vinyl chloride copolymers, cellophane, and polyvinyl acetal (Vinylon) are preferred among others.

When the odor-shielding film is a film made of such a resin as mentioned above, the above protective layer (e), which is to be peeled off, is preferably a multilayer film comprising a releasing film having releasing properties against the curable molding material layer (b) and an odor-shielding film bonded thereto so that the layer (e) may have releasing properties against the curable molding material layer (b). In this case, the releasing film is positioned to face the curable molding material layer (b).

When the odor-shielding film has hygroscopicity, the protective layer (e), which is to be peeled off, is preferably a multilayer laminated film produced by bonding a moisture-shielding film capable of shielding moisture to one or both sides of the odor-shielding film so that the odor-shielding film may be prevented from shrinking or warping as the result of moisture absorption. In this case, the moisture-shielding film is positioned at least on the side of the odor-shielding film which is opposite to the side to contact the curable molding material layer (b).

The above-mentioned releasing film or moisture-shielding film is not particularly restricted but may be, for example, a film made of a resin material such as polyethylene or polypropylene.

The above-mentioned multilayer film includes, among others, laminated films comprising an odor-shielding film and a releasing film; laminated films comprising a moisture-shielding film, an odor-shield film and a releasing film bonded together in that order.

The protective layer (e), which is to be peeled off, when it is a multilayer film, can be formed by an ordinary method of multilayer film production. The protective layer (e) to remain, without being peeled off, as a covering and permanent protective layer for the multilayer material remains on the surface of the curable molding material layer (b) even after curing thereof and provides the same with such performance characteristics as appearance, weathering resistance and chemical resistance.

The above-mentioned permanent protective layer (e) is preferably one such that the surface of the permanent protective layer (e) which is in contact with the curable molding material layer (b) has been surface-treated so that the adhesion thereof to the molding material layer after curing may become sufficient. As for the form thereof, there may be mentioned films subjected to chemical treatment and films subjected to physical treatment, among others. Films subjected to a combination of such surface treatments may also be used.

These surface treatments improve the adhesion between the permanent protective layer (e) and curable molding material layer (b) and, thereby, the above-mentioned effects are produced. The chemical treatment includes, among others, treatment with one or more of various chemicals, acid treatment, solvent treatment, and treatment with a coupling agent. The physical treatment includes, among others, mechanical surface coarsening treatment, ultraviolet irradiation treatment, plasma treatment, corona discharge treatment, and ion beam treatment. Among them, chemical treatment, plasma treatment or corona discharge treatment is preferably applied to the films.

The permanent protective layer (e) is not particularly restricted but may be any of those which can be surface-treated and have strength and flexibility so as not to impair the applicability of the multilayer material and are excellent in weathering resistance and chemical resistance. Thus usable are, for example, polyesters such as polyethylene terephthalate and polybutylene terephthalate, and fluororesins such as polyvinyl fluoride, polyvinylidene fluoride, and vinyl fluoride copolymers.

The thickness of the protective layer (e) is not particularly restricted but preferably is, for example, 3 to 3,000 $\mu$m. When it is less than 3 $\mu$m, the protective layer (e) may fail to improve the surface condition of the curable molding material layer (b) and, in addition, fail to accomplish satisfactory odor suppression. When it exceeds 3,000 $\mu$m, the workability and applicability of the multilayer material may become deteriorated. A more preferred thickness is 10 to 500 $\mu$m. The thickness of the odor-shielding film in the protective layer (e) is not particularly restricted but preferably is, for example, 3 to 2,000 $\mu$m. When it is less than 3 $\mu$m, the protective layer (e) may fail to achieve satisfactory odor suppression and, when it exceeds 2,000 $\mu$m, the protective layer (e), when it is made into a multilayer film, may reduce the workability and applicability of the multilayer material. A more preferred thickness is 5 to 500 $\mu$m.

When the curable molding material layer (b) in the multilayer material is photocurable, the protective layer (e) preferably has light transmissivity. In this case, the curable molding material layer (b) can be fully photocured.

Usable as the protective layer (e) having light transmissivity is a film made of a resin material and intended to serve as protective layer (e) which film does not contain any substance capable of reducing the light transmissivity, such as a pigment, or contains such a substance only in an amount incapable of impairing the photocurability of the curable molding material layer (b).

In the production of the multilayer material according to the invention, the order and methods of bonding the respective layers one over the other are not particularly restricted. For example, when, in the method of SMC production as described hereinabove, a light-shielding layer (a) and a laminated film comprising a tacky layer (c) and releasing layer (d) are used as carrier films, the light-shielding layer (a) and the tacky layer (c) and releasing layer (d) can be bonded to the respective sides of a curable molding material layer (b). When a laminated film comprising a light-shielding layer (a) and protective layer (e) and a laminated film comprising a tacky layer (c) and releasing layer (e) are used as carrier films, the light-shielding layer (a) and protective layer (e) and the tacky layer (c) and releasing layer (d) can be bonded to the respective sides of a curable molding material layer (b).

The multilayer material of the present invention is easy to work and apply, makes it possible to secure an ample operating time, is excellent in applicability and shows sufficient adhesiveness in response to various surface conditions and complicated shapes of various substrates such as metals, plastics, rubbers, glass, ceramic ware, stone and wood, so that the occurrence of troubles due to poor adhesion to substrates can be suppressed to a satisfactory extent. The cured products obtained therefrom have sufficient fundamental performance characteristics such as mechanical, chemical and electrical characteristics, with improved adhesion strength and durability, among others, so that the multilayer material is suited for use in constructing structural members, pipes, lining and so forth in various buildings, machines, automobiles, ships and household appliances, among others, and thus can be used in various fields of application.

The multilayer material according to the invention can be used as a reinforcing material for reinforcing or repairing various products, as mentioned hereinabove. In this case, the multilayer material itself can be applied to various substrates or another reinforcing material can be applied to various substrates through the intermediary of the multilayer material.

The above-mentioned reinforcing material is not particularly restricted but includes, among others, bar-like, pipe-like, sheet-like, and net-like reinforcing materials. These may be used singly or two or more of them may be used in combination. The reinforcing material may be combined with the multilayer material of the invention in advance or they may be combined in the step of application.

The reinforcing material comprises the multilayer material of the invention, if necessary together with another reinforcing material and/or some other material. Since the multilayer material of the invention produces the effects mentioned hereinabove, the reinforcing material makes it easy to satisfactorily reinforce or repair various substrates. Such reinforcing material thus constitutes another aspect of the invention.

In a further preferred mode of embodiment of the invention, there is provided a method of applying the multilayer material of the invention or a method of carrying out a repair using the same.

Figure 2:
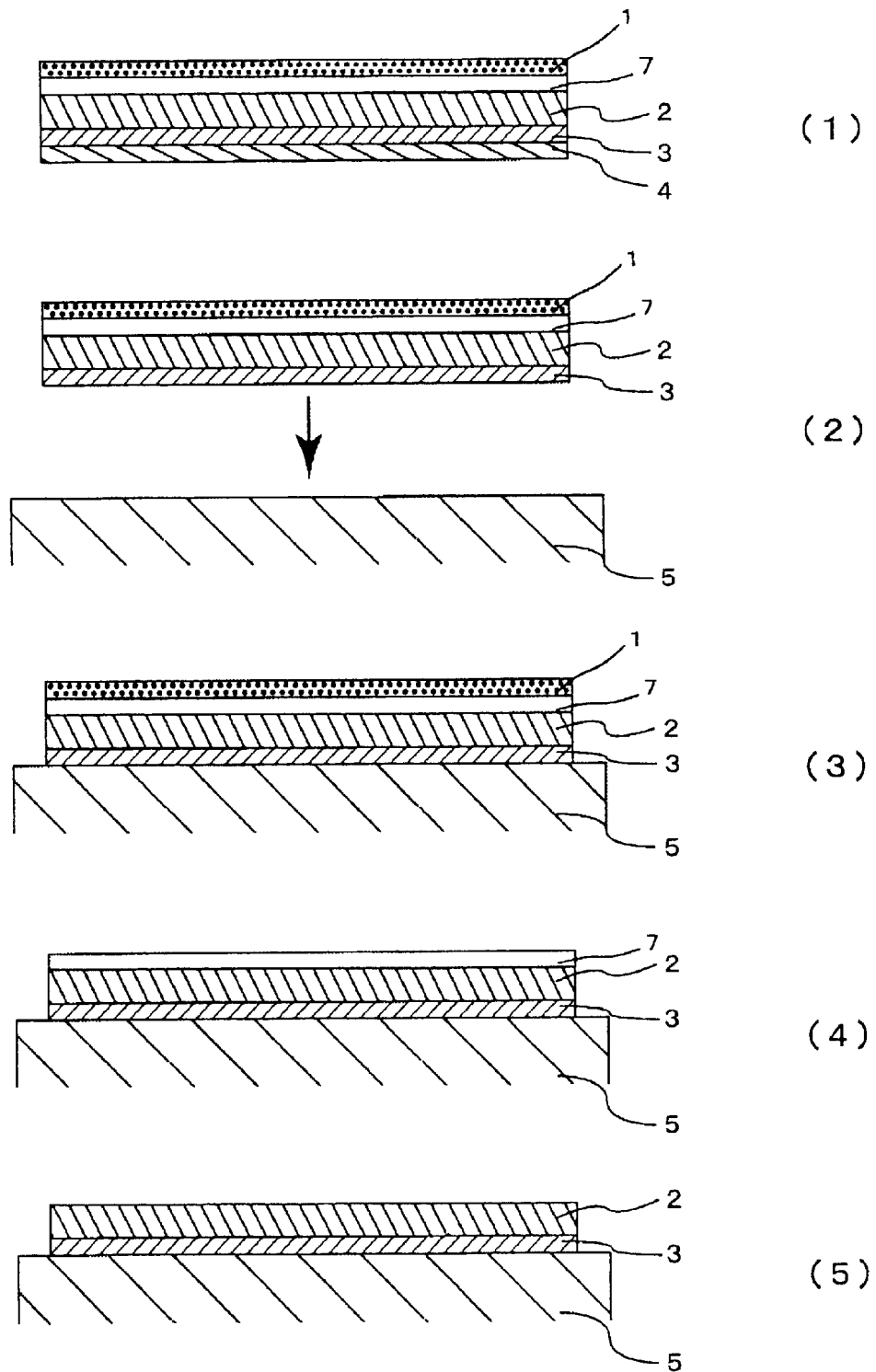
FIG. 2, (1)–(5), is a schematic representation, in cross section, of another embodiment of the multilayer material of the present invention, illustrating the steps from adhering to a substrate to curing thereof.
Figure 3:
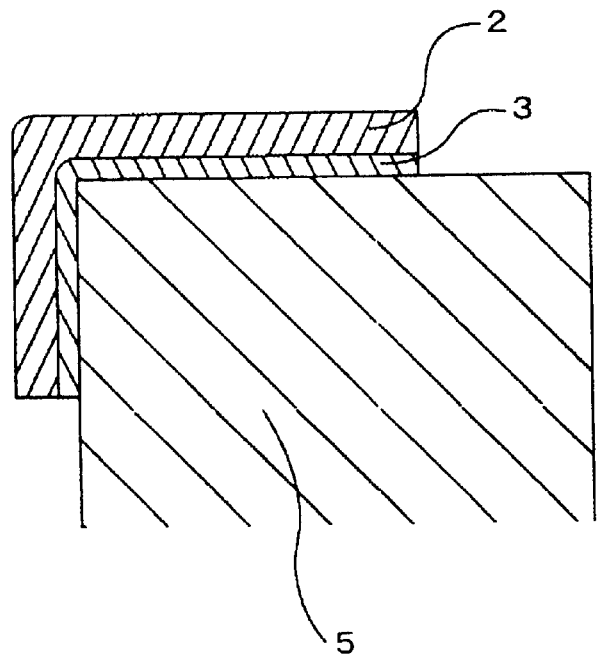
FIG. 3, (1)–(2), is a schematic representation, in cross section, of an embodiment of the multilayer material of the present invention, illustrating the condition thereof bonded to an end or curved surface of a substrate.
Figure 3:
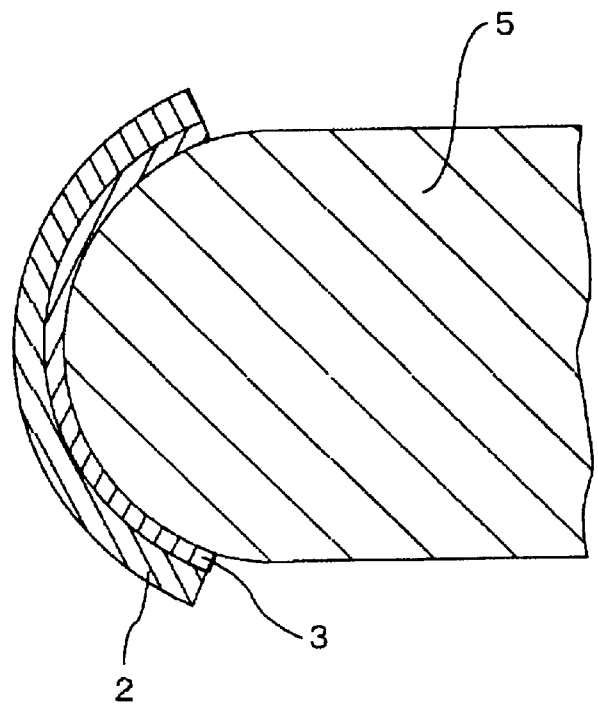

An example of the mode of embodiment of the present invention is schematically shown in FIGS. 1 to 3 in cross section.

FIG. 1(1) shows the state of a multilayer material according to the invention before application. In this condition, the multilayer material has a light-shielding layer (a) on one side of a curable molding material layer (b) and, on the other side thereof, a tacky layer (c) and a releasing layer (d) in that order from the inside. In this case, the multilayer material is preferably stored in wrapping material made of a light-shielding film, such as an aluminum-deposited film, or in a can during storage and transportation.

FIG. 1(2) shows the state of the multilayer material of the invention in which state the releasing layer (d) has been peeled off from the multilayer material of the invention for application to a substrate. In this condition, the multilayer material has the light-shielding layer (a) on one side of the curable molding material layer (b) and, on the other side thereof, it has the tacky layer (c). In this case, the substrate surface may be subjected, in advance, to some or other surface treatment for improving the adhesiveness of the multilayer material. In cases where the occurrence of troubles due to poor adhesion of the multilayer material can be satisfactorily suppressed, the substrate surface need not be subjected to such treatment.

FIG. 1(3) shows the state of the multilayer material of the invention as caused to adhere onto the substrate. In this state, the multilayer material has the light-shielding layer (a) on one side of the curable molding material layer (b) and, on the other, the tacky layer (c), with the tacky layer (c) adhering to the substrate. In this case, pressure may be applied to the multilayer material or a procedure for expelling the air that has entered between the substrate and tacky layer (c) may be carried out so that the occurrence of troubles due to poor adhesion of the multilayer material can be satisfactorily suppressed.

FIG. 1(4) shows the state of the multilayer material of the invention after removal of the light-shielding layer (a), followed by curing on the substrate. In this state, the multilayer material has the tacky layer (c) on one side of the curable molding material layer (b), with the tacky layer (c) adhering to the substrate. The multilayer material is cured in such state. In this case, the curable molding material layer (b) is cured under the action of activation energy source rays and/or heat. Irradiation with activation energy source rays is preferred since, then, the multilayer material can acquire satisfactory fundamental performance characteristics.

The above activation energy source rays are not particularly restricted but include, for example, sunlight, ultraviolet rays, infrared rays, electron beams, radiations, laser rays, high-frequency waves, and microwaves. These may be used singly or two or more of them may be used in combination.

The irradiation with the above activation energy source rays may be conducted outdoors using sunlight. For attaining sufficient curing of the curable molding material layer (b) or when sufficient sunlight irradiation is impossible, the irradiation can be carried out using an activation energy source ray irradiation apparatus.

The activation energy source ray irradiation apparatus is not particularly restricted but includes, among others, ultraviolet fluorescent lamps, low-pressure mercury lamps, (ultra)high-pressure mercury lamps, xenon lamps, mercury halogen lamps, argon glow lumps, illuminating lamps for photography, carbon arc lamps, tungsten lamps, incandescent lamps and excimer laser irradiators.

The curing time for the multilayer material of the invention is not particularly restricted. When curing is carried out using sunlight after peeling off the light-shielding layer (a) from the multilayer material, for instance, the conditions are preferably selected so that the curing may be complete in 1 minute to 10 hours. When curing is effected using ultraviolet rays, the conditions are preferably selected so that the curing may be complete in 1 minute to 5 hours. It is also preferred that the conditions be selected so as to complete the curing within 1 hour by utilizing direct rays of the sun.

After curing, the multilayer material of the invention may be subjected to surface coating or the like.

In the above mode of embodiment of the invention, the multilayer material may further comprise a film (sheet) layer other than the light-shielding layer (a), curable molding material layer (b), tacky layer (c) and releasing layer (d) unless the curing of the multilayer material is inhibited or the close bonding of the multilayer material to the substrate is impaired by the further layer. Thus, preferably, the material comprises a not-light-shielding film (sheet), such as a transparent film, namely the protective layer (e), between the light-shielding layer (a) and curable molding material layer (b).

After curing of the curable molding material layer (b), the protective layer (e) is peeled off. An embodiment of the material having such a layer (e) is shown in FIG. 2 (1) to (5). As shown in FIG. 2(1) to (5), the same procedure as illustrated in FIG. 1(1) to (4) is performed except that the protective layer (e) is peeled off after curing of the curable molding material layer (b).

The above protective layer (e) makes the surface of the curable molding material layer (b) smooth. Further, in the state shown in FIG. 2(1), it prevents a vinyl monomer, such as styrene, contained in the curable molding material layer (b) from evaporating from the multilayer material in the course of processing of the multilayer material to the desired size and shape, for both sides of the curable molding material layer (b) are covered with the light-shielding layer (a) and protective layer (e) and the tacky layer (c) and releasing layer (d), respectively. Further, in the step of curing shown in FIG. 2(4), the working environment is prevented from being contaminated with an odor to reduce the workability. As a result, the adhesion and curing operations can be carried out satisfactorily, and the curable molding material layer can be fully adhered and cured, so that the adhesion strength of the cured product is improved and the cured product acquires sufficient fundamental performance characteristics, such as mechanical, chemical and electrical characteristics. Further, the multilayer material can be applied and cured safely without workers being affected by an odor. Furthermore, the curable molding material layer (b) can be prevented from getting dirty in the uncured condition.

In the above state of (1) shown in FIG. 1 and FIG. 2, the both sides of the curable molding material layer (b) remain covered with the light-shielding layer (a) and optional protective layer (e) and the tacky layer (c) and releasing layer (d), so that the vinyl monomer, such as styrene, contained in the curable molding material layer (b) is inhibited from evaporating from the multilayer material in the course of processing of the multilayer material to the desired size and shape. Accordingly, the curable molding material layer (b) can fully be cured and the possible odor emanation during operation can be prevented.

In the above states of (2) and (3) in FIG. 1 and FIG. 2, the curable molding material layer (b) remains shielded from light by the light-shielding layer (a) and, therefore, the curable molding material layer (b) during application of the multilayer material is inhibited from curing and the flexibility of the multilayer material is fully retained, so that the applicability of the multilayer material is prevented from being impaired and the multilayer material is allowed to bond closely to the substrate. In this manner, in the states (2) and (3) shown in FIG. 1 and FIG. 2, the multilayer material can be applied with ease and a sufficient operation time can be secured.

Further, in the above states (2) and (3) shown in FIG. 1 and FIG. 2, the multilayer material is caused to adhere to the substrate through the intermediary of the tacky layer (c), so that the application procedure does not require a primer or putty and the step of application of the multilayer material can be simplified and the application cost reduced.

Furthermore, the adhering procedure is simple and easy, a uniform adhesion can be attained, and the flexibility of the multilayer material is fully retained, so that the multilayer material can be allowed to stably adhere to the substrate, with poor adhesion fully prevented. Furthermore, the multilayer material can be applied to various substrates thanks to its adhesiveness to many kinds of substrates and will not inflict a damage on them through the action of the solvent etc.

In the above state (4) shown in FIG. 1 and FIG. 2, the curable molding material layer (b) is cured fully and the multilayer material acquires necessary fundamental performance characteristics such as satisfactory mechanical, chemical and electrical characteristics. Since the curable molding material layer (b) begins to cure after peeling-off of the light-shielding layer (a), the photocurability of the curable molding material layer (b) can be modulated so as to complete the curing in such a short period as 1 minute or about 1 hour after separation of the light-shielding layer (a). As a result, the operation time can be shortened, and the curable molding material layer (b) in the uncured condition can be prevented from attracting dirts which may not be easily removed.

In the above state (4) shown in FIG. 1 and FIG. 2, when the tacky layer (c) has curability, the tacky layer (c) can be cured together with the curable molding material layer (b) to further improve the adhesion to the substrate, so that the multilayer material becomes excellent in adhesion. Thereby, the fundamental performance characteristics of the multilayer material can be further improved. Since, in the above-mentioned states of (1), (2) and (3) shown in FIG. 1 and FIG. 2, the curability of the tacky layer (c) is retained until the light-shielding layer (a) is peeled off, the curability of the tacky layer (c) can fully be displayed after separation of the light-shielding layer. In this case, it is preferred, for attaining satisfactory adhesion of the multilayer material, that the conditions be selected so as to cause the curing of the curable molding material layer (b) earlier than the curing of the tacky layer (c).

FIG. 3(1) shows the same state as in FIG. 1(4) or FIG. 2(5) and, in this case, the multilayer material has been applied to a corner of the substrate. In FIG. 3(2), the multilayer material has been applied to a curved surface of the substrate.

In the states of FIG. 3(1) and (2), the multilayer material of the invention, whose tacky layer (c) is to be adhered to a substrate, can easily be applied even to a corner of the substrate or to a substrate having a complicated shape. Further, since it is excellent in applicability and since the tacky layer (c) is excellent in adhesiveness even to a corner of the substrate or to a substrate complicated in shape, good adhesion strength and durability can be obtained while the occurrence of poor adhesion is fully suppressed.

BEST MODES FOR CARRYING OUT THE INVENTION

The following examples illustrate the present invention in more detail. These examples are, however, by no means limitative of the scope of the present invention. "Part(s)" means "part(s) by weight", and "%" means "% by weight".

SYNTHESIS EXAMPLE 1

A four-necked flask equipped with a thermometer, nitrogen inlet tube and stirrer was used as a reactor and charged with 498 parts of isophthalic acid as a saturated dibasic acid, and 418 parts of propylene glycol and 670 parts of dipropylene glycol as polyhydric alcohols, and then purged with nitrogen. Then, the dehydration reaction was carried out by heating this mixture to a maximum temperature of 215° C. with stirring. After the acid value became 10, the temperature was lowered to 50° C. and 686 parts of maleic anhydride was added as an unsaturated dibasic acid, and the dehydration reaction was continued by heating the mixture to a maximum temperature of 215° C. to give an unsaturated polyester with an acid value of 28. And, 60 parts of this unsaturated polyester, 40 parts of styrene as a vinyl monomer, and 0.02 part of hydroquinone as a stabilizer were mixed up to give an unsaturated polyester resin (A).

SYNTHESIS EXAMPLE 2

A four-necked flask equipped with a thermometer, nitrogen inlet tube and stirrer was used as a reactor and charged with 458 parts of Epiclon 850 (trademark, product of Dainippon Ink and Chemicals; obtained by reacting bisphenol A with epichlorohydrin, epoxy equivalent 189), 215 parts of methacrylic acid, 0.35 part of hydroquinone and 2.1 parts of triethylamine, the mixture was heated to 110° C. in an oxygen-containing gas stream, and the reaction was allowed to proceed for 6 hours to give a polymerizable vinyl group-containing epoxy acrylate. And, 65 parts of this epoxy acrylate, 35 parts of styrene as a vinyl monomer, and 0.02 part of hydroquinone as a stabilizer were mixed up to give an epoxy acrylate resin (B).

EXAMPLE 1

To 100 parts of the unsaturated polyester resin A obtained in Synthesis Example 1 as a curable resin were added 1.4 parts of MgO #20 (trademark, product of Kyowa Chemical Industry) as a thickening agent, 110 parts of aluminum hydroxide B-308 (trademark, product of Alcoa Kasei) as a filler, 1.0 part of Darocur 1173 (trademark, product of Ciba Specialty Chemicals) as a photopolymerization initiator, 500 ppm of methylhydroquinone as a polymerization inhibitor, and 5 parts of styrene, and the mixture was stirred for 10 minutes using a Disper agitator to give a resin mixture solution. This solution had a viscosity of 3.55 Pa·s (25° C.).

Then, a 500-mm-wide double coated adhesive tape comprising an acrylic adhesive layer, a nonwoven rayon fabric, an acrylic adhesive layer and a paper separator as a releasing layer as combined in that order was set, as a carrier film, on an SMC impregnator, with the releasing layer facing outward. While moving this carrier film, the above resin mixture solution was applied uniformly thereto to a width of 400 mm using a knife coater, and glass chops prepared by cutting glass roving AF210W (trademark, product of Asahi Fiber Glass) to about 1 inch using an automatic cutter was sprayed on that layer until they amounted to 25% by weight. The resulting laminate was covered with a layer comprising a polyethylene film, as a carrier film, provided with light-shielding effect by dispersing a black pigment therein as a light-shielding material and coated with the resin mixture solution in the same manner, and, after defoaming and impregnation on an impregnating roll, the resulting composite was rolled up on a paper tube, with the releasing paper of the double coated adhesive tape facing the inside. The whole including the paper tube was wrapped and sealed up with a wrapping material made of an aluminum-deposited polyester film and then matured at 40° C. for 48 hours for increasing the viscosity to give a multilayer material (photocurable prepreg FRP sheet) according to the invention.

The adhesion strength of this photocurable prepreg FRP sheet after the above-mentioned test curing was measured according to JIS Z 0237 and found to be 1,500 N/cm$^2$, whereas the shear tackiness strength of the initial double coated tape was 70 N/cm$^2$. The thickness of the tacky layer was 150 μm, and the thickness of the binder layer in the tacky layer was 130 μm. The photocurable prepreg FRP sheet, 150 mm wide, was applied to the whole peripheral surface of a substrate circular cylinder having a diameter of 200 mm (made of a 1-mm-thick cold rolled steel sheet) in a lot of sunshine. The substrate had been thoroughly deprived of stains, oily substances, wax and so forth in advance.

Figure 4:
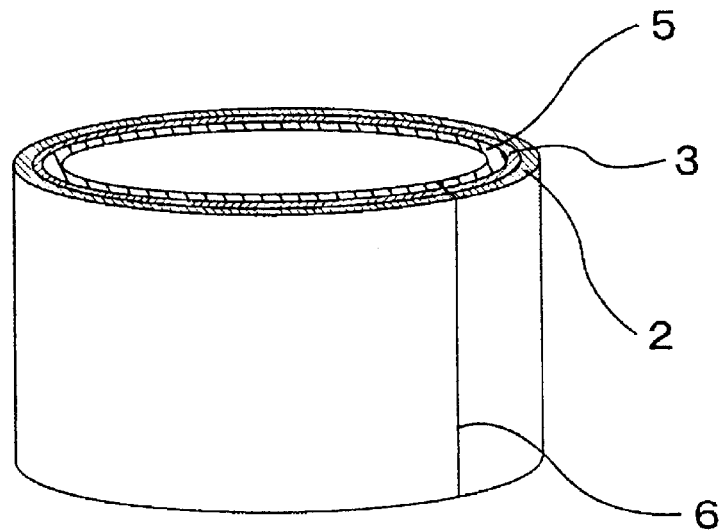
FIG. 4(1) is a schematic representation of the condition resulting from application of a photocurable prepreg FRP sheet to a cylindrical steel sheet used in examples.
Figure 4:
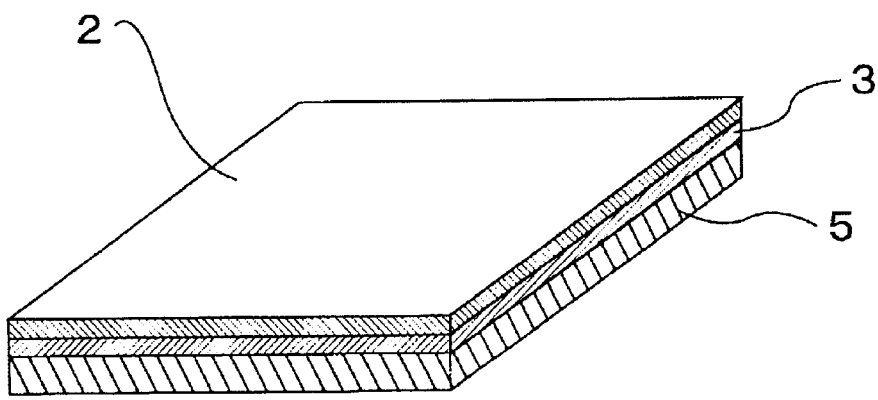

The application included the working step comprising taking of the photocurable prepreg FRP out of the wrapping and cutting the same to a size necessary for adhesion and application, the adhesion step comprising peeling off the releasing paper and causing the material to intimately adhere to the substrate, the curing step comprising peeling off the light-shielding film and exposing the material to sunlight, and the auxiliary curing step comprising curing the material in a sunlight-deficient place (in the shade) using a handy type ultraviolet irradiator (Handycure 800, product of Ushio Denki). The operation time required until curing was 45 minutes. The cylinder after application of the photocurable prepreg FRP sheet is shown in FIG. 4(1).

The workability (applicability) and adhesiveness results were evaluated according to the following criteria.

Applicability

⊚: The photocurable prepreg FRP sheet retained sufficient flexibility and the adhesion work was easy, hence the whole work could be done with ease.

○: The flexibility of the photocurable prepreg FRP sheet was impaired due to initiation of curing but the adhesion work was easy, hence the whole work could be done.

Δ: While the photocurable prepreg FRP sheet retained sufficient flexibility but the adhesion work was not easy, hence it was not easy to complete the whole work.

X: The flexibility of the photocurable prepreg FRP sheet was impaired due to initiation of curing and the adhesion work was not easy, hence it was difficult to perform the whole work.

Adhesiveness

⊚: After curing, the adhering of the photocurable prepreg FRP sheet to the substrate was sufficient, the curing of the tacky layer was sufficient, and peeling or distortion hardly occurred.

○: After curing, the adhering of the photocurable prepreg FRP sheet to the substrate was sufficient, the curing of the tacky layer was partial, and peeling hardly occurred but slight distortion occurred somewhat easily.

Δ: After curing, the adhering of the photocurable prepreg FRP sheet to the substrate was sufficient but the curing of the tacky layer was insufficient; peeling and distortion occurred somewhat easily.

X: After curing, the adhering of the photocurable prepreg FRP sheet to the substrate, though attained, was not sufficiently uniform, and peeling and distortion readily occurred.

EXAMPLE 2

A photocurable prepreg RFP sheet was obtained in the same manner as in Example 1 except that the epoxy acrylate resin B obtained in Synthesis Example 2 was used in lieu of the unsaturated polyester resin A and 11 parts of Sumidur 44V20 (trademark, product of Sumitomo Chemical; methylene diisocyanate) was used as a thickening agent in lieu of 1.4 parts of MgO #20.

The photocurable prepreg FRP sheet obtained was evaluated in the same manner as in Example 1. In the evaluation, the test conditions were the same as in Example 1.

EXAMPLE 3

A photocurable prepreg RFP sheet was obtained in the same manner as in Example 1 except that DCT-410 (trademark, product of Chugoku Kako) was used as the double coated adhesive tape and a 10-fold expanded urethane foam having a diameter of 200 mm as the substrate.

The adhesion strength of this photocurable prepreg FRP sheet after test curing was measured in the same manner as in Example 1 and was found to be 1,200 N/cm$^2$. The thickness of the tacky layer was 130 μm and the thickness of the binder layer in the tacky layer was 110 μm. The photocurable prepreg FRP sheet obtained was evaluated in the same manner as in Example 1. In the evaluation, the test conditions were the same as in Example 1. The adhesiveness was not evaluated.

EXAMPLE 4

A photocurable prepreg RFP sheet was obtained in the same manner as in Example 1 except that, in lieu of the polyethylene film provided with light-shielding effect, a laminated film comprising the polyethylene film provided with light-shielding effect and a transparent nylon film was used as the carrier film so that the light-shielding polyethylene film faced outward. In this photocurable prepreg FRP sheet, the light-shielding polyethylene film served as the light-shielding layer (a) and the transparent nylon film as the protective layer (e).

The photocurable prepreg FRP sheet obtained was evaluated in the same manner as in Example 1. The operation time required until curing of this photocurable prepreg FRP sheet was 45 minutes. After the auxiliary curing step, a step of peeling off the transparent nylon film, namely protective layer (e), was carried out. In the evaluation, the test conditions were the same as in Example 1.

EXAMPLE 5

The photocurable prepreg FRP sheet obtained in Example 1 was applied and allowed to adhere, in the sun, to a 30×30 cm steel sheet (1-mm-thick cold-rolled steel sheet) used as the substrate. The steel sheet after application of the photocurable prepreg FRP sheet thereto is illustrated in FIG. 4(2). The auxiliary curing step was not necessary since there was no portion insufficiently exposed to sunlight.

In the evaluation, the test conditions were the same as in Example 1.

EXAMPLE 6

A photocurable prepreg RFP sheet was obtained in the same manner as in Example 1 except that a double coated tape comprising a tacky layer and releasing layer without the acrylic adhesive agent-supporting member was used in lieu of the double coated adhesive tape used as the carrier film. The tacky layer in this photocurable prepreg FRP sheet had no supporting member.

The photocurable prepreg FRP sheet obtained was evaluated in the same manner as in Example 1. In the evaluation, the test conditions were the same as in Example 1.

EXAMPLE 7

A photocurable prepreg RFP sheet was obtained in the same manner as in Example 4 except that a double coated tape comprising a tacky layer and releasing layer without the acrylic adhesive agent-supporting member was used in lieu of the double coated adhesive tape used as the carrier film. This photocurable prepreg FRP sheet had a light-shielding layer (a), protective layer (e), curable molding material layer (b), tacky layer (c) and a releasing layer (d) in that order and the tacky layer (c) thereof had no supporting member.

The photocurable prepreg RFP sheet obtained was evaluated in the same manner as in Example 1. In the evaluation, the test conditions were the same as in Example 1.

EXAMPLE 8

The components (1) to (9) specified below were stirred in a disper agitator for 10 minutes, and the water content of the whole compound was measured and found to be 0.062%. For adjusting the water content to 0.2%, 0.35 part of pure water was added, and the resulting mixture was stirred for further 5 minutes to give a resin mixture solution before thickening. This solution had a viscosity of 1.9 Pa·s (25° C.).

| | | |
|---|---|---|
| (1) | Unsaturated polyester resin A | 90 parts |
| (2) | Styrene monomer | 15 parts |
| (3) | Thickening adjusting agent: pentadodecylsuccinic acid | 2 parts |
| (4) | Filler: Aluminum hydroxide B-308 | 25 parts |
| (5) | Filler: Aluminum hydroxide B-325 | 50 parts |
| (6) | Filler: Aluminum hydroxide B-30-S | 75 parts |
| (7) | Photoinitiator: Irgacure 1700 | 0.5 part |
| (8) | Photoinitiator: Darocur 1173 | 1.5 part |
| (9) | Polymerization inhibitor: parabenzoquinone | 0.03 part |
| (10) | Thickening agent: Magmicron MD-502 | 1.4 parts |

Aluminum hydroxide B-308, Aluminum hydroxide B-325 and Aluminum hydroxide B-30-S (all being trademarks) are products of Alcoa Kasei, Irgacure 1700 and Darocur 1173 (both being trademarks) are products of Ciba Specialty Chemicals, and Magmicron MD-502 (being a trademark) is a product of Mikuni Shikiso.

Then, the above thickening agent (10) was added to the resin mixture solution, and the mixture was stirred for 5 minutes. A resin-based mixture solution was thus prepared.

A 500-mm-wide carrier film, namely a double coated adhesive tape comprising an acrylic adhesive, a nonwoven rayon fabric, an acrylic adhesive and a paper separator (releasing layer) combined in that order, was set on a multilayer material production apparatus comprising a film transfer apparatus equipped with a double coated adhesive tape unwinding mechanism and a knife coater, and a heating/maturation oven, with the releasing layer facing downward. While moving this carrier film, the above resin-based mixture solution was uniformly applied onto the carrier film to a width of 400 mm using the knife coater, and glass chops prepared by cutting glass roving RS-230N-572-AN (trademark, product of Nittobo) to a length of 1 inch using an automatic cutter were spread thereover in an amount of 12% by weight. While feeding a nonwoven glass fiber fabric FPL-4025 (trademark, product of Japan Vilene) onto the laminate, the glass fiber used as a reinforcing fiber was impregnated with the resin-based mixture solution from above, with simultaneous defoaming, using a grooved Teflon roll having a diameter of 150 mm and, while thus forming a curable molding material layer and transferring the laminate, a nylon film, namely a protective layer, was fed to and pressed against the laminate by means of a roll with a diameter of 200 mm to thereby seal the curable molding material layer with the protective layer and attain a predetermined thickness. The resulting sheet-like material was led to a heating/maturation oven, namely the next step.

This sheet-like material was passed through the heating/maturation oven maintained at 80° C. and thus matured for 20 minutes, and then rapidly cooled with cold air to 35° C. or below, an aluminum-deposited polyester film to serve as a light-shielding layer was fed to and overlaid on the protective layer and, while causing the polyester film to adhere to the protective layer, the whole laminate was taken up on a paper tube, with the releasing paper of the double coated adhesive tape facing outward. The laminate, together with the paper tube, was further hermetically wrapped with an aluminum-deposited polyester film to give a multilayer material of the invention (photocurable prepreg FRP sheet).

The resin-based mixture solution used in the above multilayer material, when matured under the same conditions, showed a viscosity of 423 Pa·s at 40° C.

The photocurable prepreg FRP sheet obtained was applied to a substrate bend pipe (a pipe made of 1-mm-thick cold-rolled steel sheet having a radius of curvature of 1,000 mm and a diameter of 200 mm) in a width of 150 mm around the entire circumference, in a sun-lit place. The substrate had been fully derived of stains, oily substances, wax and so forth in advance.

The application was carried out in the same manner as in Example 1, and the operation time required until curing was 50 minutes. After curing, the protective layer was removed to complete the application work. The total time for application was 60 minutes.

The workability (applicability) and adhesiveness in this application were evaluated in the same manner as in Example 1.

EXAMPLE 9

A light-gray photocurable FRP prepreg sheet was obtained in the same manner as in Example 8 except that 35 parts of B-30-S and 40 parts of Frit JH-1922 (trademark, product of Nippon Frit) with a mean particle size of 100 microns were used in lieu of 75 parts of B-30-S used as the filler.

The water content of the whole compound used prior to water content adjustment was 0.055% and, therefore, 0.375 part of pure water was added to adjust the water content to 0.2%. The viscosity after maturation was 380 Pa·s at 40° C.

The sheet was applied in the same manner as in Example 8. The operation time required until curing was 70 minutes. After curing, the protective layer was removed to complete the application work. The total time for application was 80 minutes.

The light-gray photocurable FRP prepreg sheet required a curing time almost two times that for the colorless FRP prepreg sheet but it was confirmed that it has an advantage that post-painting can be omitted since light-gray finishing can be attained.

The workability (applicability) and adhesiveness in this application were evaluated in the same manner as in Example 1.

EXAMPLE 10

A photocurable prepreg FRP sheet was obtained in the same manner as in Example 4 except that a 2.5-μm-thick polyvinyl fluoride film subjected to corona discharge treatment on one side was used in lieu of the transparent nylon film used as the protective layer (e) so that the treated face came into contact with the resin-based mixture solution.

The photocurable FRP sheet obtained was evaluated in the same manner as in Example 1. The operation time required until curing of this photocurable prepreg FRP sheet was 50 minutes.

As shown in Table 1, marked improvement in weathering resistance was attained by using the polyvinyl fluoride film as a permanent protective layer (e).

TABLE 1

| | | Ex. | |
|---|---|---|---|
| | | 4 | 10 |
| | | Surface gloss (%) | |
| Weathermeter irradiation time (hr) | After 1000 hours | 60 (Rough surface) | 90 |
| | After 5000 hours | 50 (Rough surface) | 90 |
| | After 10000 hours | 40 (Rough surface) | 80 (Glossy) |

COMPARATIVE EXAMPLE 1

A photocurable resin mixture solution was prepared in the same manner as in Example 1and, then, a 500-mm-wide polyethylene film provided with light-shielding effect by dispersing a black pigment therein was set as a carrier film on an SMC impregnator. While moving this carrier film, the resin mixture solution was uniformly applied onto it using a knife coater to a width of 400 mm, and glass chops prepared by cutting glass roving AF210W to about 1 inch using an automatic cutter were spread over the resin layer. The laminate was covered with a layer comprising a polyethylene film as a carrier film and the resin mixture solution applied thereto and, after defoaming and impregnation using an impregnating roll, the resulting laminate was taken up on a paper tube. The laminate, together with the paper tube, was hermetically wrapped with a wrapping material made of an aluminum-deposited polyester film and then matured for thickening at 40° C. for 48 hours to give a photocurable prepreg FRP sheet for comparison.

The comparative photocurable prepreg FRP sheet obtained was applied by adhesion and curing in the same manner as in Example 1. The area of the substrate for application of the photocurable prepreg FRP sheet had been fully deprived of stains, oily substances, wax and so forth and subjected to primer treatment. After application of 300 gr/m² of the primer (Mighty Grip9036, trademark, product of E-TEC) and thorough drying, the sheet was applied by the same working, adhesion, curing and auxiliary curing procedure as in Example 1.

Its evaluation was made in the same manner as in Example 1.

COMPARATIVE EXAMPLE 2

A photocurable prepreg FRP sheet was prepared and applied by adhesion and curing in the same manner as in Comparative Example 1 except that a transparent polyethylene film was used as the carrier film.

Its evaluation was made in the same manner as in Example 1.

The evaluation results of Examples 1 to 10 and Comparative Examples 1 and 2 are shown in Table 2.

TABLE 2

| | Ex. | | | | | | | | | | Compar. Ex. | |
|---|---|---|---|---|---|---|---|---|---|---|---|---|
| | 1 | 2 | 3 | 4 | 5 | 6 | 7 | 8 | 9 | 10 | 1 | 2 |
| Adhesion strength of photocurable prepreg FRP sheet (N/cm²) | | | | | | | | | | | | |
| Tackiness strength before curing | 70 | 70 | 50 | — | — | — | — | — | — | — | — | — |
| Tackiness strength after curing | 1500 | 1500 | 1200 | — | — | — | — | — | — | — | — | — |
| Number of steps for application | 4 | 4 | 4 | 5 | 3 | 4 | 5 | 5 | 5 | 5 | 5 | 5 |
| Operation time | 45 min. | 45 min. | 45 min. | 45 min. | 30 min. | 45 min. | 45 min. | 60 min. | 80 min. | 50 min. | 3 hrs. | 3 hrs. |
| Applicability | ◎ | ◎ | ◎ | ◎ | ◎ | ◎ | ◎ | ◎ | ◎ | ◎ | △ | X |
| Adhesiveness | ○ | ○ | — | ○ | ○ | ◎ | ◎ | ◎ | ◎ | ○ | X | X |

As is evident from Table 2, it was found, in Examples 1 to 10, that the multilayer materials of the invention are excellent in applicability and can be stably adhered to substrates in a smaller number of steps for application and during a shorter operation time with satisfactory suppression of the occurrence of poor adhesion, hence can be applied to various substrates in various fields.

INDUSTRIAL APPLICABILITY

The multilayer material of the invention, which has the above constitution, is excellent in applicability, is satisfactorily prevented from causing poor adhesion to various substrates, gives cured products having sufficient fundamental performance characteristics with improved adhesion strength, durability etc. and, accordingly, can be applied in various fields of use, including structural members, pipes and lining materials of various buildings, machines, automobiles, ships, and household utensils, among others.

What is claimed is:

1. A multilayer material comprising a light-shielding layer (a), a curable molding material layer (b), a tacky layer (c) and a releasing layer (d), with one side of the curable molding material layer (b) having the light-shielding layer (a) and the other side having the tacky layer (c) and releasing layer (d) in that order from the inside, and comprising a protective layer (e) between the light-shielding layer (a) and the curable molding material layer (b), said tacky layer (c) comprising a binder and having curability being provided by an unsaturated monomer contained in the curable molding material layer (b) migrating to the tacky layer (c).

2. The multilayer material according to claim 1, wherein an adhesive layer formed by the tacky layer (c) has an adhesion strength of 20 to 2,000 N/cm$^2$ after test curing.

3. The multilayer material according to claim 1, wherein the curable molding material layer (b) and/or tacky layer (c) is photocurable.

4. A reinforcing material comprising the multilayer material according to claim 1.

5. The multilayer material according to claim 2, wherein the curable molding material layer (b) and/or tacky layer (c) is photocurable.

6. A reinforcing material comprising the multilayer material according to claim 2.

7. A reinforcing material comprising the multilayer material according to claim 3.

8. The multilayer material according to claim 1, wherein the curable molding material layer (b) comprises a succinic acid derivative containing 8 to 30 carbon atoms in total as a thickening adjusting agent.

9. The multilayer material according to claim 1, wherein the protective layer (e) is an odor-shielding film.

10. The multilayer material according to claim 9, wherein the odor-shielding film comprises a resin material selected from the group consisting of polyamide resin, polyester, polyvinyl chloride, polyvinylidene chloride, vinyl choloride copolymer, cellophane, and polyvinyl acetal.

* * * * *